United States Patent
Tokunaga et al.

(10) Patent No.: US 10,501,053 B2
(45) Date of Patent: Dec. 10, 2019

(54) SYSTEM AND METHOD FOR PROVIDING ACCESS TO A VEHICLE AND ENABLING DATA OFF-BOARDING

(71) Applicant: Honda Motor Co., Ltd., Tokyo (JP)

(72) Inventors: Kazunori Tokunaga, Redondo Beach, CA (US); Alvin T. Yuan, Carson, CA (US); Cesar Cabral, Long Beach, CA (US)

(73) Assignee: Honda Motor Co., Ltd., Tokyo (JP)

( * ) Notice: Subject to any disclaimer, the term of this patent is extended or adjusted under 35 U.S.C. 154(b) by 590 days.

(21) Appl. No.: 15/289,364

(22) Filed: Oct. 10, 2016

(65) Prior Publication Data

US 2018/0103022 A1    Apr. 12, 2018

(51) Int. Cl.
    *B60R 25/24* (2013.01)

(52) U.S. Cl.
    CPC .................................... *B60R 25/24* (2013.01)

(58) Field of Classification Search
    CPC ... B60R 2325/205; B60R 25/01; B60R 25/20; B60R 25/2018; G06Q 30/0645; G07B 15/02; G07B 15/06; G07B 15/063; G07C 2009/00388; G07C 9/00309; G07C 5/008; G08G 1/205; G06K 7/10712; G06K 7/1095; G06K 2209/15; G06K 2209/23; G06K 9/00785; G06K 9/00805; G05D 1/0088; G05D 2201/0213; G05D 1/0225; G05D 1/0297; B60W 30/18009; G01G 19/021
    See application file for complete search history.

(56) References Cited

U.S. PATENT DOCUMENTS

| | | |
|---|---|---|
| 6,310,542 B1 | 10/2001 | Gehlot |
| 6,765,497 B2 | 7/2004 | Ablay et al. |
| 6,853,910 B1 | 2/2005 | Oesterling et al. |
| 7,092,799 B2 | 8/2006 | Oesterling et al. |
| 7,236,783 B2 | 6/2007 | Gould |
| 7,269,482 B1 | 9/2007 | Shultz et al. |
| 7,302,315 B2 | 11/2007 | Oesterling et al. |
| 7,526,285 B2 | 4/2009 | Mazzara, Jr. |

(Continued)

FOREIGN PATENT DOCUMENTS

| | | |
|---|---|---|
| GB | 2516377 | 1/2015 |
| GB | 2529388 | 2/2016 |

(Continued)

*Primary Examiner* — Abiy Getachew
(74) *Attorney, Agent, or Firm* — Rankin, Hill & Clark LLP

(57) ABSTRACT

A method and system for providing access to a vehicle and enabling data off-boarding that include associating a primary portable device to the vehicle and granting privileges to the primary portable device. The method and system also include associating at least one secondary portable device to the vehicle by granting privileges to the at least one secondary portable device through the primary portable device. The method and system additionally include providing terms and conditions related to data off-boarding to the primary portable device and providing terms and conditions related to data off-boarding to the at least one secondary portable device when the at least one secondary portable device is linked to the vehicle through the primary portable device. The method and system further include controlling off-boarding of vehicle data of a driver when the terms and conditions are accepted.

20 Claims, 7 Drawing Sheets

(56) References Cited

U.S. PATENT DOCUMENTS

| | | | |
|---|---|---|---|
| 7,610,120 B2 | 10/2009 | Christensen | |
| 7,634,263 B2 | 12/2009 | Louch et al. | |
| 7,778,186 B2 | 8/2010 | Oman et al. | |
| 7,821,383 B2 | 10/2010 | Sultan et al. | |
| 7,823,073 B2 | 10/2010 | Holmes et al. | |
| 7,881,940 B2 | 2/2011 | Dusterhoff | |
| 8,055,277 B2 | 11/2011 | Park et al. | |
| 8,089,339 B2 | 1/2012 | Mikan et al. | |
| 8,090,367 B2 | 1/2012 | Kameyama | |
| 8,112,817 B2 | 2/2012 | Chiruvolu et al. | |
| 8,126,450 B2 | 2/2012 | Howarter et al. | |
| 8,170,526 B2 | 5/2012 | Tieman et al. | |
| 8,232,864 B2 | 7/2012 | Kakiwaki | |
| 8,280,791 B2 | 10/2012 | Davis, III et al. | |
| 8,299,895 B2 | 10/2012 | Harris | |
| 8,390,474 B2 | 3/2013 | Yi et al. | |
| 8,428,642 B2 | 4/2013 | Tieman et al. | |
| 8,428,815 B2 | 4/2013 | Van Engelshoven et al. | |
| 8,522,320 B2 | 8/2013 | Kleve et al. | |
| 8,571,580 B2 | 10/2013 | Altman et al. | |
| 8,578,454 B2 | 11/2013 | Grim | |
| 8,700,252 B2 | 4/2014 | Ubik et al. | |
| 8,706,349 B2 | 4/2014 | Rector et al. | |
| 8,707,044 B2 | 4/2014 | Shim et al. | |
| 8,761,998 B2 | 6/2014 | Chen et al. | |
| 8,799,360 B2 | 8/2014 | Nicholson et al. | |
| 8,838,332 B2 | 9/2014 | Moinzadeh et al. | |
| 8,843,110 B2 | 9/2014 | Laghrari et al. | |
| 8,854,199 B2 | 10/2014 | Cook et al. | |
| 8,855,614 B2 | 10/2014 | Varoglu et al. | |
| 8,884,740 B2 | 11/2014 | Kuebler et al. | |
| 8,886,367 B2 | 11/2014 | Abo El-Fotouh | |
| 8,909,212 B2 | 12/2014 | Pandya et al. | |
| 8,912,924 B2 | 12/2014 | Scofield et al. | |
| 8,918,242 B2 | 12/2014 | Ubik et al. | |
| 8,918,643 B2 | 12/2014 | Okude | |
| 8,930,229 B2 | 1/2015 | Bowne et al. | |
| 8,930,231 B2 | 1/2015 | Bowne et al. | |
| 8,938,544 B2 | 1/2015 | Wakikawa et al. | |
| 8,947,202 B2 | 2/2015 | Tucker et al. | |
| 8,966,383 B2 | 2/2015 | Gautier et al. | |
| 8,989,778 B2 | 3/2015 | Altman et al. | |
| 8,995,914 B2 | 3/2015 | Nishidai | |
| 9,002,536 B2 | 4/2015 | Hatton | |
| 9,008,641 B2 | 4/2015 | Yang et al. | |
| 9,014,910 B2 | 4/2015 | Grau et al. | |
| 9,104,537 B1 | 8/2015 | Penilla et al. | |
| 9,135,756 B2 | 9/2015 | Doughty et al. | |
| 9,148,743 B2 | 9/2015 | Timm et al. | |
| 9,161,327 B2 | 10/2015 | Boughton et al. | |
| 9,174,552 B2 | 11/2015 | Ikeda et al. | |
| 9,183,441 B2 | 11/2015 | Blumer et al. | |
| 9,203,843 B2 | 12/2015 | Arasavelli et al. | |
| 9,224,289 B2 | 12/2015 | Demeniuk et al. | |
| 9,229,905 B1 | 1/2016 | Penilla et al. | |
| 9,230,438 B2 | 1/2016 | Barrett | |
| 9,241,253 B2 | 1/2016 | Siegel et al. | |
| 9,242,619 B2 | 1/2016 | Choi | |
| 9,245,391 B2 | 1/2016 | Cook et al. | |
| 9,246,951 B2 | 1/2016 | Siegel et al. | |
| 9,307,410 B2 | 4/2016 | Smereka et al. | |
| 9,311,271 B2 | 4/2016 | Wright | |
| 9,311,685 B2 | 4/2016 | Harkey et al. | |
| 9,348,492 B1 | 5/2016 | Penilla et al. | |
| 9,351,102 B2 | 5/2016 | Tucker et al. | |
| 9,358,940 B2 | 6/2016 | Cooper et al. | |
| 9,361,650 B2 | 6/2016 | Binion et al. | |
| 9,367,968 B2 | 6/2016 | Giraud et al. | |
| 9,374,679 B2 | 6/2016 | Song et al. | |
| 2004/0239488 A1 | 12/2004 | Douglass, Jr. et al. | |
| 2008/0133129 A1 | 6/2008 | Park et al. | |
| 2009/0243791 A1 | 10/2009 | Partin et al. | |
| 2010/0241857 A1* | 9/2010 | Okude | B60R 25/24 713/168 |
| 2010/0280711 A1 | 11/2010 | Chen et al. | |
| 2011/0169755 A1 | 7/2011 | Murphy et al. | |
| 2011/0196571 A1 | 8/2011 | Foladare et al. | |
| 2011/0247013 A1 | 10/2011 | Feller et al. | |
| 2012/0066301 A1 | 3/2012 | Holland | |
| 2012/0079002 A1 | 3/2012 | Boll et al. | |
| 2012/0100806 A1 | 4/2012 | Hall | |
| 2013/0030645 A1 | 1/2013 | Divine et al. | |
| 2013/0030882 A1 | 1/2013 | Davis, III et al. | |
| 2013/0143584 A1 | 6/2013 | Mechaley, Jr. | |
| 2013/0297100 A1 | 11/2013 | Petersen et al. | |
| 2013/0331147 A1 | 12/2013 | Chang et al. | |
| 2014/0006137 A1 | 1/2014 | Melen et al. | |
| 2014/0040434 A1 | 2/2014 | Rybak et al. | |
| 2014/0129080 A1 | 5/2014 | Leibowitz et al. | |
| 2014/0170978 A1 | 6/2014 | Wolman et al. | |
| 2014/0215457 A1 | 7/2014 | Gava et al. | |
| 2014/0222971 A1* | 8/2014 | Cooper | H04L 67/12 709/219 |
| 2014/0229035 A1 | 8/2014 | Rector et al. | |
| 2014/0266594 A1 | 9/2014 | Reiser | |
| 2014/0303837 A1 | 10/2014 | Tuukkanen | |
| 2015/0004911 A1 | 1/2015 | Schmidt | |
| 2015/0024705 A1 | 1/2015 | Rashidi | |
| 2015/0061828 A1 | 3/2015 | Fischer et al. | |
| 2015/0105941 A1 | 4/2015 | Pandya et al. | |
| 2015/0127390 A1 | 5/2015 | Bowne et al. | |
| 2015/0148989 A1 | 5/2015 | Cooper et al. | |
| 2015/0149545 A1 | 5/2015 | Kim et al. | |
| 2015/0208194 A1 | 7/2015 | Ito et al. | |
| 2015/0213656 A1 | 7/2015 | Stacy | |
| 2015/0223032 A1 | 8/2015 | Nespolo et al. | |
| 2015/0229637 A1 | 8/2015 | Sim | |
| 2015/0249741 A1 | 9/2015 | Fischer | |
| 2015/0294309 A1 | 10/2015 | Busser et al. | |
| 2015/0310681 A1 | 10/2015 | Avery et al. | |
| 2015/0332531 A1 | 11/2015 | Davidsson et al. | |
| 2016/0004281 A1 | 1/2016 | Fischer | |
| 2016/0035151 A1 | 2/2016 | McEwan et al. | |
| 2016/0037307 A1 | 2/2016 | Roth | |
| 2016/0055699 A1 | 2/2016 | Vincenti | |
| 2016/0065710 A1 | 3/2016 | Lee et al. | |
| 2016/0071333 A1 | 3/2016 | Haidar et al. | |
| 2016/0071395 A1 | 3/2016 | Demeniuk et al. | |
| 2016/0082926 A1 | 3/2016 | Mouser et al. | |
| 2016/0088422 A1 | 3/2016 | Foster | |
| 2016/0101787 A1 | 4/2016 | Cook et al. | |
| 2016/0128016 A1 | 5/2016 | Avary et al. | |
| 2016/0150066 A1 | 5/2016 | Yae | |
| 2016/0150556 A1 | 5/2016 | Chun | |
| 2016/0173501 A1 | 6/2016 | Brown | |
| 2016/0197782 A1 | 7/2016 | Hort et al. | |
| 2016/0197783 A1 | 7/2016 | Hort et al. | |

FOREIGN PATENT DOCUMENTS

| | | |
|---|---|---|
| WO | WO2008050136 | 5/2008 |
| WO | WO2012082035 | 6/2012 |
| WO | WO2016066192 | 5/2016 |

* cited by examiner

| USER ID | DEVICE ID | USER TYPE | ACCESSING PRIVILEGE LEVEL | ENABLING PRIVILEGE LEVEL |
|---|---|---|---|---|
| USER 1 | PHN 1 | PRIMARY | PERMANENT ADMINISTRATOR | PERMANENT ADMINISTRATOR |
| USER 2 | FOB 2 | AUTHENTICATED | LEVEL 1: FULL PERMANANT ACCESS | LEVEL 1: FULL PERMANANT USE |
| USER 3 | PHN 2 | AUTHENTICATED | LEVEL 2: TEMP 30 DAY ACCESS | LEVEL 2: TEMP FULL IGG ON |
| USER 4 | FOB 1 | AUTHENTICATED | LEVEL 3: TEMP 3 HOUR ACCESS | LEVEL 3: TEMP FULL IGG ON |
| USER 5 | PHN 3 | AUTHENTICATED | LEVEL 1: FULL PERMANANT ACCESS | NO PRIVILEGES GRANTED |
| USER 6 | PHN 4 | AUTHENTICATED | LEVEL 1: FULL PERMANANT ACCESS | LEVEL 1: FULL PERMANANT USE |

FIG. 3

SYSTEM AND METHOD FOR PROVIDING ACCESS TO A VEHICLE AND ENABLING DATA OFF-BOARDING

BACKGROUND

Based on established privacy principles, a vehicle owner may be required to provide consent when vehicle data is sent off-board. The vehicle data may include, but is not limited to, information provided by a number of sensors, systems, and/or components of the vehicle. For example, the vehicle data may include a vehicle identification number (VIN), stored points of interest (POI) information, geolocation information, vehicle system output information, or the like. The vehicle data may be packaged and provided to an external entity, for example, an external server.

Currently, vehicles may be utilized by a vehicle owner as well as other individuals. For example, a vehicle may be utilized by numerous drivers within a household in addition to the designated vehicle owner. Obtaining proper consent may be challenging when sharing vehicle data in view of the established privacy principals, for example, when a user, who is not the designated vehicle owner has accessed and/or is attempted to drive the vehicle.

Additionally, it may be challenging for a vehicle owner to provide access to the vehicle and an ability for the additional individuals to drive the vehicle while providing the proper consent. In many cases, the vehicle owner has to make multiple copies of vehicle keys which may be lost or stolen. However, with most vehicles currently utilizing smart key FOBs, it has become more challenging for vehicle owners to obtain multiple smart key FOBs to provide them to multiple additional individuals while also providing the proper consent for the vehicle data to be shared when those additional individuals are accessing and/or driving the vehicle.

BRIEF DESCRIPTION

According to one aspect, a method for providing access to a vehicle and enabling data off-boarding that include associating a primary portable device to the vehicle and granting privileges to the primary portable device. The also includes associating at least one secondary portable device to the vehicle by granting privileges to the at least one secondary portable device through the primary portable device. The method additionally includes providing terms and conditions related to data off-boarding to the primary portable device when the primary portable device is linked to the vehicle and providing terms and conditions related to data off-boarding to the at least one secondary portable device when the at least one secondary portable device is linked to the vehicle through the primary portable device. The method further includes controlling off-boarding of vehicle data of a driver associated with the primary portable device when the terms and conditions on the primary portable device are accepted and controlling off-boarding of vehicle data of an authorized user associated with the at least one secondary portable device when the terms and conditions on the at least one secondary portable device are accepted.

According to a further aspect, a system for providing access to a vehicle and enabling data off-boarding includes a memory storing instructions when executed by a processor cause the processor to link at least one secondary portable device to the vehicle by granting privileges to the at least one secondary portable device through a primary portable device. The system also causing the processor to provide terms and conditions related to data off-boarding to the at least one secondary portable device when the at least one secondary portable device is linked to the vehicle through the primary portable device. The system further causing the processor to control off-boarding of vehicle data of a driver associated with the at least one secondary portable device when the terms and conditions on the at least one secondary portable device are accepted.

According to still another aspect, a system for providing access to a vehicle and enabling data off-boarding includes a memory storing instructions when executed by a processor cause the processor to link a primary portable device to the vehicle and grant privileges to the primary portable device through an externally hosted server infrastructure. The system also causing the processor to provide terms and conditions related to data off-boarding to the primary portable device when the primary portable device is linked to the vehicle through the externally hosted server infrastructure. The system further causing the processor to control off-boarding of vehicle data of a driver associated with the primary portable device when the terms and conditions on the primary portable device are accepted.

BRIEF DESCRIPTION OF THE DRAWINGS

FIG. 3 is an illustrative vehicle link table that is associated with a vehicle according to an exemplary embodiment;

DETAILED DESCRIPTION

Figure 1:
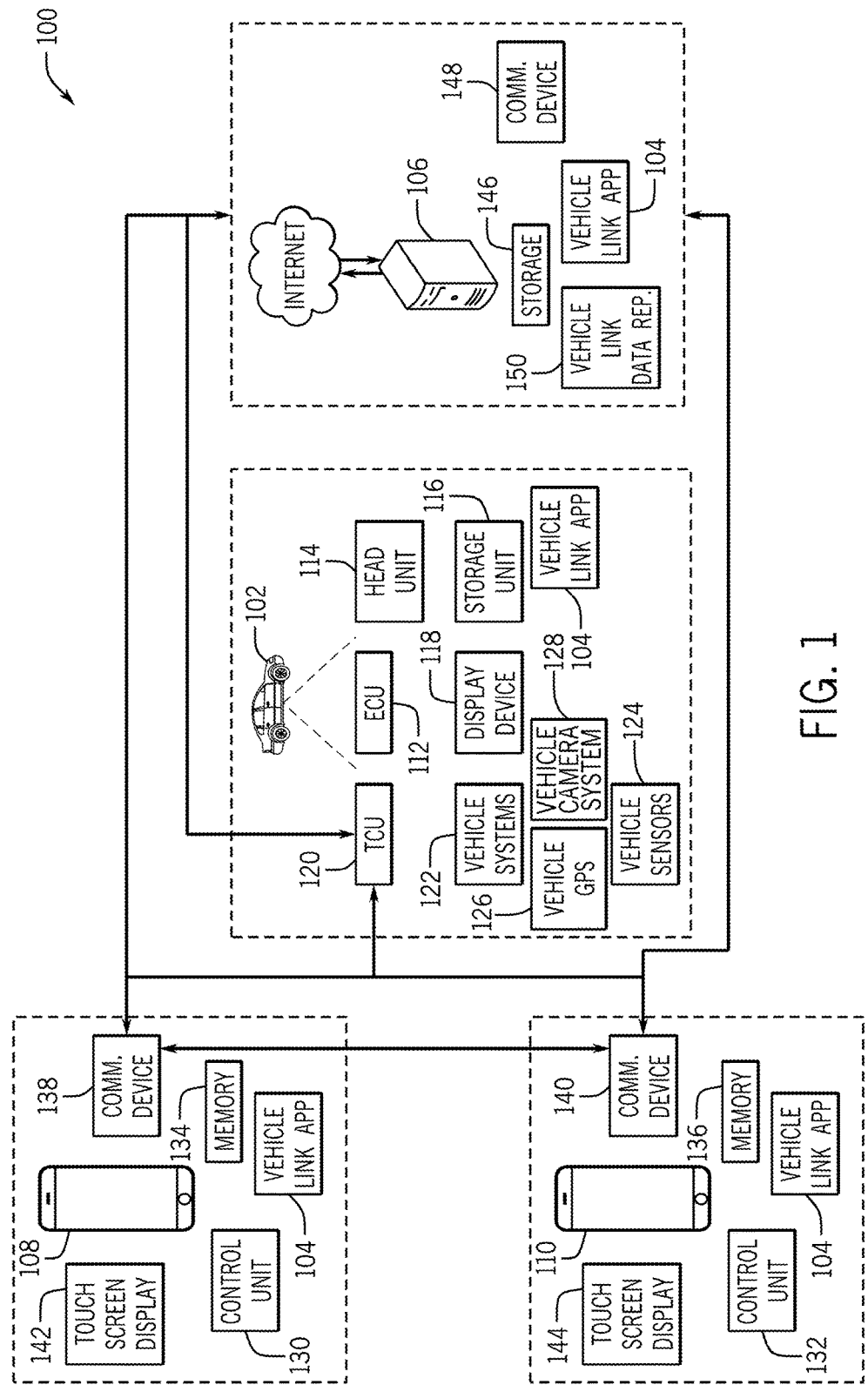
FIG. 1 is a schematic view of an illustrative vehicle link system for providing access to a vehicle and enabling data off-boarding from the vehicle according to an exemplary embodiment.

The following includes definitions of selected terms employed herein. The definitions include various examples and/or forms of components that fall within the scope of a term and that may be used for implementation. The examples are not intended to be limiting.

A "bus", as used herein, refers to an interconnected architecture that is operably connected to other computer components inside a computer or between computers. The bus may transfer data between the computer components. The bus may be a memory bus, a memory controller, a peripheral bus, an external bus, a crossbar switch, and/or a local bus, among others. The bus may also be a vehicle bus that interconnects components inside a vehicle using protocols such as Media Oriented Systems Transport (MOST), Controller Area network (CAN), Local Interconnect Network (LIN), among others.

"Computer communication", as used herein, refers to a communication between two or more computing devices (e.g., computer, personal digital assistant, cellular telephone, network device) and may be, for example, a network transfer, a file transfer, an applet transfer, an email, a hypertext transfer protocol (HTTP) transfer, and so on. A computer communication may occur across, for example, a wireless system (e.g., IEEE 802.11), an Ethernet system (e.g., IEEE 802.3), a token ring system (e.g., IEEE 802.5), a local area network (LAN), a wide area network (WAN), a point-to-point system, a circuit switching system, a packet switching system, among others.

A "disk", as used herein may be, for example, a magnetic disk drive, a solid state disk drive, a floppy disk drive, a tape drive, a Zip drive, a flash memory card, and/or a memory stick. Furthermore, the disk may be a CD-ROM (compact disk ROM), a CD recordable drive (CD-R drive), a CD rewritable drive (CD-RW drive), and/or a digital video ROM drive (DVD ROM). The disk may store an operating system that controls or allocates resources of a computing device.

A "database", as used herein may refer to table, a set of tables, and a set of data stores and/or methods for accessing and/or manipulating those data stores. Some databases may be incorporated with a disk as defined above.

A "memory", as used herein may include volatile memory and/or non-volatile memory. Non-volatile memory may include, for example, ROM (read only memory), PROM (programmable read only memory), EPROM (erasable PROM), and EEPROM (electrically erasable PROM). Volatile memory may include, for example, RAM (random access memory), synchronous RAM (SRAM), dynamic RAM (DRAM), synchronous DRAM (SDRAM), double data rate SDRAM (DDR SDRAM), and direct RAM bus RAM (DRRAM). The memory may store an operating system that controls or allocates resources of a computing device.

An "operable connection", or a connection by which entities are "operably connected", is one in which signals, physical communications, and/or logical communications may be sent and/or received. An operable connection may include a wireless interface, a physical interface, a data interface and/or an electrical interface.

A "processor", as used herein, processes signals and performs general computing and arithmetic functions. Signals processed by the processor may include digital signals, data signals, computer instructions, processor instructions, messages, a bit, a bit stream, or other means that may be received, transmitted and/or detected. Generally, the processor may be a variety of various processors including multiple single and multicore processors and co-processors and other multiple single and multicore processor and co-processor architectures. The processor may include various modules to execute various functions.

A "portable device", as used herein, is a computing device typically having a display screen with user input (e.g., touch, keyboard) and a processor for computing. Portable devices include, but are not limited to, handheld devices, mobile devices, smart phones, laptops, tablets and e-readers. In some embodiments, a "portable device" could refer to a remote device that includes a processor for computing and/or a communication interface for receiving and transmitting data remotely.

A "vehicle", as used herein, refers to any moving vehicle that is capable of carrying one or more human occupants and is powered by any form of energy. The term "vehicle" includes, but is not limited to: cars, trucks, vans, minivans, SUVs, motorcycles, scooters, boats, go-karts, amusement ride cars, rail transport, personal watercraft, and aircraft. In some cases, a motor vehicle includes one or more engines. Further, the term "vehicle" may refer to an electric vehicle (EV) that is capable of carrying one or more human occupants and is powered entirely or partially by one or more electric motors powered by an electric battery. The EV may include battery electric vehicles (BEV) and plug-in hybrid electric vehicles (PHEV). The term "vehicle" may also refer to an autonomous vehicle and/or self-driving vehicle powered by any form of energy. The autonomous vehicle may or may not carry one or more human occupants. Further, the term "vehicle" may include vehicles that are automated or non-automated with pre-determined paths or free-moving vehicles.

A "wearable computing device", as used herein may include, but is not limited to, a computing device component (e.g., a processor) with circuitry that may be worn by and/or in possession of a user. In other words, a wearable computing device is a computer that is subsumed into the personal space of a user. Wearable computing devices may include a display and may include various sensors for sensing and determining various parameters associated with a user. For example, location, motion, and biosignal (physiological) parameters, among others. Some wearable computing devices have user input and output functionality. Exemplary wearable computing devices may include, but are not limited to, watches, glasses, clothing, gloves, hats, shirts, jewelry, rings, earrings necklaces, armbands, shoes, earbuds, headphones and personal wellness devices.

A "value" and "level", as used herein may include, but is not limited to, a numerical or other kind of value or level such as a percentage, a non-numerical value, a discrete state, a discrete value, a continuous value, among others. The term "value of X" or "level of X" as used throughout this detailed description and in the claims refers to any numerical or other kind of value for distinguishing between two or more states of X. For example, in some cases, the value or level of X may be given as a percentage between 0% and 100%. In other cases, the value or level of X could be a value in the range between 1 and 10. In still other cases, the value or level of X may not be a numerical value, but could be associated with a given discrete state, such as "not X", "slightly x", "x", "very x" and "extremely x".

I. System Overview

Referring now to the drawings, wherein the showings are for purposes of illustrating one or more exemplary embodiments and not for purposes of limiting the same, FIG. 1 is a schematic view of an illustrative vehicle link system 100 for providing access to a vehicle 102 and enabling data off-boarding from the vehicle 102 according to an exemplary embodiment. The components of the system 100, as well as the components of other systems, hardware architectures, and software architectures discussed herein, may be combined, omitted, or organized into different architectures for various embodiments.

Generally, the system 100 may include a vehicle link application 104. The vehicle link application 104 may be hosted and executed at a plurality of locations, that may include, but are not limited to the vehicle 102, an externally hosted server infrastructure 106, and/or one or more portable devices that may include a primary portable device 108 that is utilized by a designated vehicle owner (not shown) of the vehicle 102, and one or more secondary portable devices 110 that are utilized by users (not shown) authorized to access and/or use (e.g., drive) the vehicle 102 by the designated vehicle owner. For purposes of illustration, the designated vehicle owner may be classified as a primary driver of the vehicle 102, and the users authorized to access and/or use the vehicle 102 may be classified as authorized users of the vehicle 102. For example, the authorized users of the vehicle 102 may include additional drivers of the vehicle 102 permitted by the primary driver to access and enable the vehicle 102 in order to drive the vehicle 102.

As will be described in more detail below, the primary driver of the vehicle 102 may utilize the vehicle link application 104 to identify themselves as the designated vehicle owner in order to grant authorization to authorized users of the vehicle 102 to access (e.g., unlock/lock one or more locations of the vehicle 102) and/or enable (e.g., enable/disable one or more ignition modes of the vehicle 102) the vehicle 102. This authorization may be granted in a form of accessing privileges associated with the vehicle 102 and a form of enabling privileges associated with the vehicle 102. For example, the vehicle link application 104 may allow the primary driver to link (e.g., pair, connect) the primary portable device 108 with the vehicle 102 to access and enable the vehicle 102. The primary portable device 108 may send one or more signals to the vehicle 102 to lock and unlock the doors and compartments of the vehicle 102 and turn on and turn off the vehicle ignition to enable an engine (not shown) of the vehicle 102.

In an exemplary embodiment, the one or more secondary portable devices 110 may be linked to the vehicle 102 and may be provided with a level of vehicle accessing privileges and vehicle enabling privileges as determined by the primary driver to allow the one or more authorized users to access (e.g., unlock/lock one or locations of the vehicle 102) and/or enable (e.g., enable/disable one or more ignition modes of the vehicle 102) the vehicle 102 through their respective linked secondary portable devices 110.

Moreover, in one embodiment, the vehicle link application 104 additionally enables the primary driver to select one or more types of vehicle data that may be off-boarded from the vehicle 102 and may additionally enable the primary driver and/or the one or more authorized users of the vehicle 102 to provide proper consent through their respective linked portable devices 108, 110 to off-board the one or more types of vehicle data selected by the primary driver from the vehicle 102 to the externally hosted server infrastructure 106. In other words, in addition to allowing the primary driver to provide consent through his or her linked primary portable device 108 to enable the vehicle 102 to off-board vehicle data, the vehicle link application 104 also may allow the one or more authorized users to provide their own consent to off-board the vehicle data from the vehicle 102 through their linked secondary portable devices 110. In one embodiment, as discussed in more detail below, upon the one or more authorized users being linked to the vehicle 102 and possibly identified, accessing privileges and/or enabling privileges to the vehicle 102 may be granted through the primary portable device 108 to the one or more secondary portable devices 110. In an alternate embodiment, upon the one or more authorized users being linked to the vehicle 102 and identified if necessary, the primary portable device 108 may grant a level of accessing privileges and enabling privileges (described in more detail below) based on a respective input provided by the primary driver through the primary portable device 108. For example, the primary driver may input to provide unlimited accessing privileges and enabling privileges to the one or more authorized users to the vehicle 102 for a predetermined amount of time that enables the primary portable device 108 to grant the unlimited accessing privileges and enabling privileges to the one or more respective secondary portable devices 110.

With continued reference to the illustrated embodiment of FIG. 1, the vehicle 102 may generally include an electronic control unit 112 (ECU), a head unit 114, a storage unit 116, a display device 118, a telematics communication unit 120, a plurality of vehicle systems 122, in addition to a plurality of vehicle sensors 124. The plurality of vehicle systems 122 may include a GPS system 126 that operably connects to a navigation system (not shown) of the vehicle 102. Additionally, the plurality of vehicle systems 122 may include a vehicle camera system 128. The vehicle camera system 128 may include one or more cameras (not shown) that are positioned at various locations within and/or outside of the vehicle 102. The one or more cameras may capture images within and/or outside of the vehicle 102 including images of a specific driver of the vehicle 102.

The plurality of vehicle systems 122 may also generally include, but are not limited to, (additional vehicle systems not shown) a vehicle HVAC system, a vehicle infotainment system, a vehicle engine control system, a vehicle transmission control system, vehicle safety control systems, vehicle stability control systems, an electronic stability control system, an anti-lock brake system, a brake assist system, an automatic brake prefill system, a low speed follow system, a cruise control system, a collision warning system, a collision mitigation braking system, an auto cruise control system, a lane departure warning system, a blind spot indicator system, a lane keep assist system, a brake pedal system, an electronic power steering system, a proximity sensor systems, and an electronic pretensioning system, among others.

In one or more embodiments, the plurality of vehicle sensors 124 may generally include contact sensors and/or non-contact sensors that are positioned at various locations within and/or outside of the vehicle 102. The plurality of vehicle sensors 124 may include electric current/potential (e.g., proximity sensors, inductive, capacitive), ultrasonic (e.g., piezoelectric, electrostatic), vibration, optical, vision, photoelectric or oxygen sensors, among others. In an exemplary embodiment the plurality of vehicle sensors 124 may include sensors that are operable to sense a measurement of data associated with the specific driver of the vehicle 102, the vehicle 102, a vehicle environment, the plurality of vehicle systems 122, and/or one or more occupants of the vehicle 102, and may output one or more data signals indicating one or more measurements of data to the ECU 112. In one embodiment, the ECU 112 may convert the data signals into other data formats in order to generate other data metrics and parameters such as values and levels that may be provided to the vehicle link application 104.

In one or more embodiments, the ECU 112 may include internal processing memory, an interface circuit, and bus lines (all not shown) for transferring data, sending commands, and communicating with the other vehicle components. Generally, the ECU 112 includes a processor and memory (not shown). In some embodiments, the ECU 112 also includes a communications device (not shown) for sending data internally in the vehicle 102 and externally to connected devices. The communication device included within the ECU 112 is capable of providing wired or wireless computer communications utilizing various protocols to send/receive electronic signals internally to the vehicle components.

In an exemplary embodiment, the head unit 114 of the vehicle 102 may be utilized to execute one or more applications that may include the vehicle link application 104 that are stored on the storage unit 116. In one embodiment, the head unit 114 may be operably controlled by the ECU 112 to provide output of one or more of the plurality of vehicle systems 122. In an alternate embodiment, the head unit 114 may include a separate controller (not shown) that may be used to control operation of the head unit 114 through a microprocessor (not shown).

With respect to the storage unit 116, in addition to storing the one or more applications, the storage unit 116 may store one or more operating systems associated operating system data, application data, vehicle system and subsystem user interface data, and the like that are executed by the ECU 112 through the head unit 114. The storage unit 116 may also include vehicle data related to the identity and use of the vehicle 102 and/or the identity of the driver of the vehicle 102 that may include, but is not limited to the VIN of the vehicle 102, make and model information of the vehicle 102, a data log (not shown) of the vehicle 102, vehicle settings data, vehicle driver data, and the like. In one embodiment, the data log of the vehicle 102 may include various types of data that are logged by the ECU 112, the head unit 114, the plurality of vehicle systems 122, among additional vehicle components. In one or more embodiments, the vehicle data may be associated with the primary driver and/or one or more authorized users of the vehicle 102. For example, the vehicle data may be specific data that may include vehicle settings data that are associated to a specific driver of the vehicle 102.

In an exemplary embodiment, the storage unit 116 may store a provisioning file (e.g., data file(s)) (not shown) that is associated to the vehicle 102. As described in more detail below, the provisioning file may be created and associated with the vehicle 102 upon linking the primary portable device 108 to the vehicle 102 and granting privileges to the primary portable device 108. Additionally, the provisioning file may be sent (e.g., transmitted) to the vehicle 102 to be stored on the storage unit 116 based on an authentication of the primary driver of the vehicle 102 through the primary portable device 108. In one embodiment, the provisioning file may include information in the form of a collection of digital data that includes indications of one or more types of vehicle data that are selected by the primary driver to be off-boarded from the vehicle 102. As will be described, in one embodiment, the primary driver may utilize the vehicle link application 104 to create and/or update the provisioning file by selecting the one or more types of vehicle data that may be off-boarded from the vehicle 102 after receiving consent of terms and conditions from the primary driver of the vehicle 102 and/or one or more authorized users of the vehicle 102.

In one embodiment, the storage unit 116 may additionally store a driver profile (e.g., data file(s)) (not shown) that is associated to the primary driver, and/or the one or more authorized users of the vehicle 102. The driver profile may include data pertaining to the primary driver and/or the one or more authorized users of the vehicle 102 that includes but is not limited to facial images, driving pattern data, wearable device identification data, biometric profiling data, and additional parameters that apply to the primary driver and/or the one or more authorized users. The vehicle link application 104 may evaluate the driver profile to identify a current driver of the vehicle 102 as the primary driver or the one or more authorized users of the vehicle 102 to allow the granting of vehicle accessing and/or enabling privileges to the primary portable device 108 or the respective secondary portable device(s) 110 of the one or more authorized users of the vehicle 102.

In one or more embodiments, the head unit 114 may also include a communication device (not shown) that may be operably connected for internal computer communications to the display device 118, the TCU 120, in addition to additional components of the vehicle 102. The communication device may send and receive data signals to the TCU 120. For instance, the vehicle link application 104 may use the communication device to receive data signals from the TCU 120 based upon the acceptance of terms and conditions from the primary driver through his or her primary portable device 108 and/or the one or more authorized users through their respective secondary portable devices 110.

In one embodiment, the display device 118 may provide a human machine interface (HMI) to provide a driver(s) and occupant(s) of the vehicle 102 with various types of information. The display device 118 may include a display screen (not shown) that may be a flat panel display. In some embodiments, the display screen of the display device 118 may be a touch screen that may be used to provide touch inputs to user interfaces provided via the head unit 114. In some embodiments, the vehicle link application 104 may present one or more user interfaces through the display device 118 in order to interact with the primary driver and/or one or more authorized users of the vehicle 102 to receive a consent and/or a confirmation of consent to off-board vehicle data.

In an exemplary embodiment, the TCU 120 of the vehicle 102 may be an external interface for mobile communication that facilitates the sending and receiving of data between the vehicle 102 and the primary portable device 108, the one or more secondary portable devices 110, the externally hosted server infrastructure 106, and/or additionally externally hosted systems (not shown). The TCU 120 may also be connected to the ECU 112 and is capable of providing wired or wireless computer communications utilizing various protocols to be applied to send/receive electronic signals internally to the head unit 114, and the plurality of vehicle systems 122, among other components within the vehicle 102 and to external devices. In one embodiment, the TCU 120 may be an external interface for mobile communication between the vehicle 102 and the externally hosted server infrastructure 106 through an internet cloud. More specifically, the TCU 120 may utilize a global system for mobile communications (GSM), general packet radio service (GPRS), Wi-Fi®, WiMax®, Bluetooth®, or LTE® wireless connection to send and receive one or more data signals to and from primary portable device 108, the one or more secondary portable devices 110, and/or externally hosted server infrastructure 106 directly through the internet cloud.

In one embodiment, as discussed in more detail below, the TCU 120 may be utilized by the vehicle link application 104 to send and receive a variety of signals that may include linking signals, identification signals, vehicle access signals, vehicle enabling signals, user consent signals, command signals, and the like to and from the primary portable device 108, the one or more secondary portable devices 110 and/or the externally hosted server infrastructure 106.

In one embodiment, the vehicle link application 104 may access the one or more selected types of vehicle data from the storage unit 116 to be off-boarded from the vehicle 102 via the TCU 120. In particular, the one or more types of vehicle data that may be accessed by the vehicle link application 104 may be selected to be off-boarded based on an evaluation of the provisioning file to determine the specific types of vehicle data that may be off-boarded from the vehicle 102 via the TCU 120, as selected by the primary driver of the vehicle 102. For instance, the vehicle link application 104 may evaluate the provisioning file and access the type of vehicle data that is stored on the storage unit 116 that includes a selected type of vehicle data of geolocation information (e.g., GNSS, GPS coordinates) associated with the vehicle 102 as provided by the GPS system 126. In another example, the vehicle link application 104 may evaluate the provisioning file and access the type of vehicle data that is stored on the storage unit 116 that includes a selected type of vehicle data of POI information related to POIs specifically selected and stored by the primary driver and/or one or more authorized users to be used by the vehicle navigation system and/or GPS system 126. As will be described in more detail below, the vehicle link application 104 may off-board the vehicle data that is stored within the storage unit 116 based on the consent provided by the primary driver and/or one or more authorized users that is provided in the form of an acceptance of terms and conditions.

In one embodiment, the vehicle link application 104 may utilize one or more systems of the plurality of vehicle systems 122 to provide the one or more selected types of vehicle data to be off-boarded by the vehicle 102 via the TCU 120 to the externally hosted server infrastructure 106 based on the evaluation of the provisioning file. For instance, based on the consent provided by the primary driver and/or one or more authorized users that is provided in the form of an acceptance of terms and conditions and the evaluation of the provisioning file to determine the one or more selected types of vehicle data to be off-boarded, the vehicle link application 104 may utilize the GPS system 126 to determine the geolocation of the vehicle 102. The vehicle link application 104 may also utilize the TCU 120 to further communicate the geolocation of the vehicle 102 to the externally hosted server infrastructure 106. In some embodiments, the vehicle link application 104 may also employ additional vehicle systems of the plurality of vehicle systems 122 to communicate vehicle dynamics information and/or vehicle directional information to the TCU 120 to be communicated from the vehicle 102 to the externally hosted server infrastructure 106 based on the evaluation of the provisioning file. In additional embodiments, the vehicle link application 104 may employ the vehicle navigation system to communicate stored navigational data that may include POI information to the TCU 120 to be further communicated from the vehicle 102 to the externally hosted server infrastructure 106 based on the evaluation of the provisioning file.

With reference to the portable devices 108, 110 of the system 100, as discussed above, the primary portable device 108 may be used by the primary driver of the vehicle 102, and the one or more secondary portable devices 110 may be used by the one or more authorized users of the vehicle 102. In the exemplary embodiment shown in FIG. 1, the primary portable device 108 and the one or more secondary portable devices 110 may be a computing device that includes respective control units 130, 132, respective memories 134, 136, respective communication devices 138, 140, and respective touch screen displays 142, 144. Generally, the primary portable device 108 and the one or more secondary portable devices 110 may include, but are not limited to, a handheld device, a mobile device, a smart phone, a smart key fob, a tablet, an e-reader, and the like.

The primary portable device 108 and the one or more secondary portable devices 110 may include a corresponding device identification (device ID). The device ID may be a unique identifier that may be utilized by the vehicle link application 104 to link the primary portable device 108 and the one or more secondary portable devices 110 to the vehicle 102. In one embodiment, the device ID may include a unique identification code that is assigned by the vehicle link application 104 that identifies the user of the respective portable devices 108, 110. In another embodiment, the device ID may include the serial number corresponding to the respective portable devices 108, 110. As discussed below, upon linking the primary portable device 108 the respective device IDs of the portable devices 108, 110 may be sent to the vehicle 102, communicated between one another, and/or sent the externally hosted server infrastructure 106 to be stored and used by the vehicle link application 104.

The control units 130, 132 of the devices 108, 110 generally include memory, an interface circuit, and bus lines (all not shown), for transferring data, sending command for respectively controlling an overall operation of the primary portable device 108 and the one or more secondary portable device 110. The respective memories 134, 136 of the devices 108, 110 may store one or more operating systems associated operating system data, application data, and associated application data. In addition, the memories 134, 136 may store the device ID of the respective portable devices 108, 110. In some embodiments, the memories 134, 136 may store user identification (user ID) information that respectively identifies the primary driver using the primary portable device 108 and the one or more authorized users using their respective secondary portable devices 110. In additional embodiments, the memories 134, 136 may store a vehicle identification number (VIN) of the vehicle 102 once the primary portable device 108 and/or secondary portable device 110 are linked to the vehicle 102.

The respective communication devices 138, 140 of the primary portable device 108 and the one or more secondary portable devices 110 may be used to communicate with one or more components of the system 100 and/or additional systems and components outside of the system 100. The communication devices 138, 140 may include, but are not limited to, one or more transmitters (not shown), one or more antennas (not shown), and additional components (not shown) that may be used for wired and wireless computer connections and communications via various protocols. In one or more embodiments, the respective communication devices 138, 140 may be used by the primary portable device 108 and the one or more secondary portable devices 110 to bilaterally communicate amongst each other through a GSM, a GPRS, Wi-Fi®, WiMax®, Bluetooth®, or LTE® wireless connection that may be configured to provide data connections to support the exchange of data signals between the devices 108, 110. In an exemplary embodiment, the vehicle link application 104 may utilize the communication devices 138, 140 to send and receive a variety of signals that may include linking signals, identification signals, vehicle accessing signals, vehicle enabling signals, user consent signals, command signals, etc. between the primary portable device 108 and the one or more secondary portable devices 110, the devices 108, 110 and the vehicle 102, and/or the devices 108, 110 and the externally hosted server infrastructure 106.

In an exemplary embodiment, the respective touch screen displays 142, 144 of the primary portable device 108 and the one or more secondary portable devices 110 enable user input (e.g., touch input) on various user interfaces that are presented via the touch screen displays 142, 144. In one embodiment, the vehicle link application 104 may present user interfaces via the respective touch screen displays 142, 144. As discussed below, the primary driver and/or the authorized users may utilize the user interfaces to access and/or utilize the vehicle 102 in addition to providing consent to off-board vehicle data from the vehicle 102 to the externally hosted server infrastructure 106.

With reference to the externally hosted server infrastructure 106 of the system 100, in one or more embodiments, the externally hosted server infrastructure 106 may include a plurality of interconnected servers (not shown) that may include but are not limited to web servers, data servers, database servers, domain controllers, backup servers, and the like. In one embodiment, the plurality of interconnected servers may include one or more server clusters that may be located at a plurality of different locations (e.g., at a non-local global site and at a local national site). In particular, the plurality of interconnected servers may include a parent server cluster (not shown) and a child server cluster (not shown). In one embodiment, the parent server cluster of the externally hosted server infrastructure 106 may execute high level functions of the vehicle link application 104. The child server cluster of the externally hosted server infrastructure 106 may execute lower level functions of the vehicle link application 104. In an exemplary embodiment, the externally hosted server infrastructure 106 may also include storage 146 that may be dispersed (e.g., between multiple hard drives) between the plurality of interconnected servers to support and maintain data that are related to operating systems and applications, among additional data. In alternate embodiments, the storage 146 may reside externally from the interconnected servers and may be access through an internet cloud.

The externally hosted server infrastructure 106 may include one or more communication devices 148 that may be used to connect to the internet cloud (e.g., via a WI-FI connection) in order to send and receive data between the interconnected servers of the externally hosted server infrastructure 106 and externally to and from components within the system 100 and external to the system 100. In one embodiment, the vehicle link application 104 may utilize the communication device(s) 148 to send and receive a variety of signals that may include linking signals, authentication signals, vehicle accessing signals, vehicle enabling signals, user consent signals, command signals, etc. to the TCU 120 to be communicated to the head unit 114 and/or the ECU 112 of the vehicle 102, the primary portable device 108, and/or the one or more secondary portable devices 110.

In an exemplary embodiment, the externally hosted server infrastructure 106 may include a vehicle data link repository 150 that is stored on the storage 146. The vehicle data link repository 150 may store a vehicle link table associated with the vehicle link application 104. In alternate embodiments, the vehicle data link repository 150 may be replicated to the storage unit 116 of the vehicle 102 and/or the memory 134 of the primary portable device 108.

FIG. 3 is an illustrative example of an exemplary vehicle link table 300 that is associated with the vehicle 102. As discussed in more detail below, the vehicle link application 104 may be utilized by the primary driver of the vehicle 102 to populate underlying records that reside within entries associated with the primary driver and possibly one or more authorized uses of the vehicle 102. The records are associated with the fields 302-310 of the vehicle link table 300. The vehicle link table 300 may be provided in a variety of formats and with a variety of fields that include associated records within entries in lieu or in addition to the fields 302-310 shown within the exemplary table 300.

In an exemplary embodiment, the vehicle link table 300 may include an entry that is associated with the primary driver or the vehicle 102 and may possibly include one or more entries associated with the respective authorized users of the vehicle 102. In one embodiment, the entry associated with the primary driver of the vehicle 102 may also be associated with the provisioning file that is associated with the vehicle 102. Additionally, the one or more entries associated with the respective authorized users of the vehicle 102 may also be associated with the provisioning file that is associated with the vehicle 102 and was created with the input of the primary driver of the vehicle 102. As discussed herein, the provisioning file may dictate the one or more types of vehicle data as selected by the primary driver that may be off-boarded from the vehicle 102 upon receiving consent of the terms and conditions from the primary driver and/or the one or more authorized users.

In an exemplary embodiment, the vehicle link table 300 may include a user ID field 302 that is populated with user names of the primary driver and the one or more authorized users that respectively utilize the primary portable device 108 and the one or more secondary portable devices 110 that are linked to the vehicle 102 by the vehicle link application 104. The vehicle link table 300 may also include a device ID field 304 that is populated with device IDs on the primary portable device 108 and possibly one or more secondary portable devices 110 that are linked to the vehicle 102. In addition, the table 300 may include a user type field 306 that may include a designation of the primary driver and possibly one or more authorized users authorized by the primary driver. Additionally, the table 300 may include an accessing privilege level field 308 and an enabling privilege level field 310 that may include a designation of the types and levels of privileges granted to the primary driver and possibly one or more authorized users through their respective primary portable device 108 and one or more secondary portable devices 110. As will be described in more detail below, the table may be referenced, populated, and/or queried by one or more modules of the vehicle link application 104 to link the primary portable device 108 and one or more secondary portable devices 110.

II. The Vehicle Link Application

The vehicle link application 104 and its specific functionality will now be described in more detail according to an exemplary embodiment and with reference again to FIG. 1. In this embodiment, the vehicle link application 104 may be stored on the storage unit 116 of the vehicle 102 to be executed by the head unit 114 of the vehicle 102. Additionally, the vehicle link application 104 may be stored on the respective memories 134, 136 of the primary portable device 108 and the one or more secondary portable devices 110 to be executed by the devices 108, 110. The vehicle link application 104 may also be stored on the storage 146 of the externally hosted server infrastructure 106 to be executed by the one or more interconnected servers of the externally hosted server infrastructure 106. It is to be appreciated that the vehicle link application 104 may be stored at additional locations and executed by additional components outside of the system 100.

Figure 2:
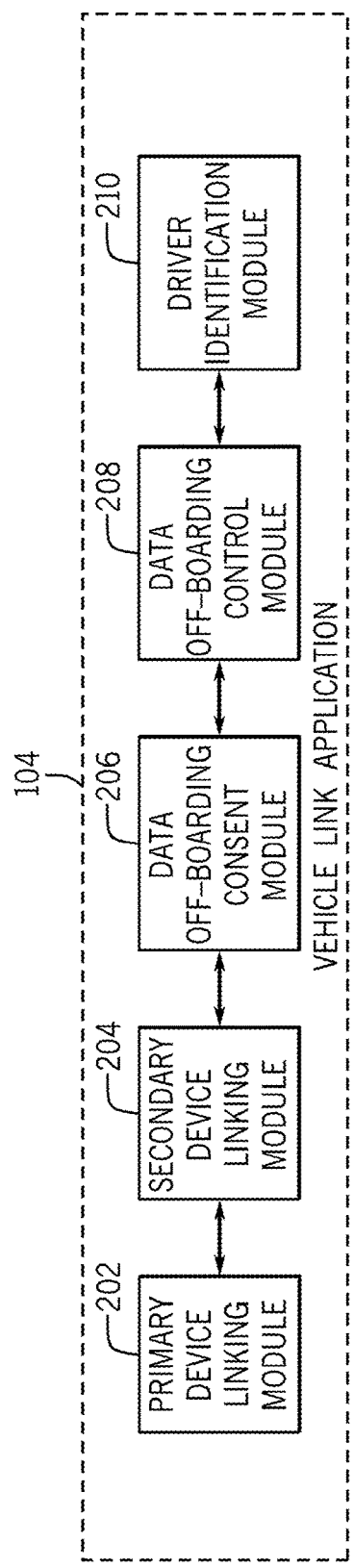
FIG. 2 is a schematic view of components of an illustrative vehicle link application according to an exemplary embodiment.

With respect to FIG. 2, a schematic view of the components (e.g., software based components) of an illustrative embodiment of the vehicle link application 104 according to an exemplary embodiment is provided. The vehicle link application 104 may include a plurality of modules 202-210 that provide a plurality of functions. As shown, in an exemplary embodiment, the vehicle link application 104 may include a primary device linking module 202, a secondary device linking module 204, a data off-boarding consent module 206, a data off-boarding control module 208, and a driver identification module 210.

In an exemplary embodiment, the primary driver of the vehicle 102 may utilize the vehicle link application 104 to identify himself or herself as a designated vehicle owner in order to access and enable the vehicle 102 and to provide authorization to one or more authorized users of the vehicle 102 to access and/or enable the vehicle 102 to unlock or lock one or more locations of the vehicle 102 and/or enable or disable one or more ignition modes of the vehicle 102. Furthermore, the vehicle link application 104 additionally enables the primary driver and/or the one or more authorized users of the vehicle 102 to provide proper consent through their respective linked portable devices 108, 110 through the acceptance of presented terms and conditions to off-board vehicle data from the vehicle 102 to the externally hosted server infrastructure 106.

In an exemplary embodiment, the primary device linking module 202 of the vehicle link application 104 may link the primary portable device 108 to the vehicle 102. In particular, linking of the primary portable device 108 to the vehicle 102 may allow the communication device 138 of the primary portable device 108 to be paired with the TCU 120 of the vehicle 102 to bilaterally communicate a plurality of signals, that may include, but are not limited to vehicle accessing signals, vehicle enabling signals, user consent signals, command signals, and the like.

In one embodiment, when the primary device linking module 202 determines that the primary portable device 108 is not linked to the vehicle 102 (i.e., the primary driver had not previously utilized the vehicle link application 104 to link his or her primary portable device 108 to the vehicle 102), the primary device linking module 202 may initiate a linking process that allows the primary driver to link the primary portable device 108 to the vehicle 102 by providing a vehicle owner profile creation user interface to the primary driver. In one embodiment, the vehicle owner creation user interface may be provided to the primary driver through the touch screen display 142 of the primary portable device 108. In another embodiment, the vehicle owner creation user interface may be provided to the primary driver through the display device 118 within the vehicle 102. The vehicle owner profile creation user interface may provide capability for the primary driver to create a user account with a user ID and a password associated with the primary driver and may manually or automatically input the device ID of the primary portable device 108 within the vehicle owner profile. The primary device linking module 202 may store the vehicle owner profile within the vehicle data link repository 150 and may create an entry (labeled as 312 in FIG. 3) that is associated with the primary driver. Upon creation of the entry, the primary device linking module 202 may create one or more records under one or more fields on the vehicle link table 300 that may be related to the entry and may be populated with data from the vehicle owner profile. Therefore, upon designating the primary driver of the vehicle 102, the primary device linking module 202 may create and populate records under the user ID field 302 and device ID field 304 that includes the primary driver's user ID and the device ID associated with the primary portable device 108.

In an alternate embodiment, upon initial setup of the vehicle link application 104, the primary device linking module 202 may present the vehicle owner profile creation user interface that requires the primary driver to designate himself or herself as the vehicle owner and setup the vehicle owner profile by creating a user ID and a password that is associated with the primary driver. Upon creation of the vehicle owner profile and designating the primary driver of the vehicle 102, the primary device linking module 202 may store the user account within the vehicle data link repository 150 and may create an entry on the vehicle link table 300 that is associated with the primary driver. Within the alternate embodiment, the primary device linking module 202 may present a request user interface input (e.g., icon) through a user interface of the vehicle link application 104 that may be presented through the touch screen display 142 of the primary portable device 108. Upon input of the request user interface input, the primary device linking module 202 may present a user ID/password prompt to the primary driver for the primary driver to input the user ID/password associated with him or her. Upon receiving the user ID/password that is associated with the primary driver, the primary device linking module 202 may provide a query on the vehicle link table 300 based on the user ID/password to confirm the designation of the primary driver.

More specifically, in one embodiment, the primary device linking module 202 may perform a query on the vehicle link table 300 under the user ID field for a record that corresponds to the user ID. Upon finding the record with the corresponding user ID of the primary driver, the primary device linking module 202 may determine that the primary driver was designated and the primary device linking module 202 may link the primary portable device 108 to the vehicle 102. In one embodiment, the primary device linking module 202 may send a command signal to the externally hosted server infrastructure 106 to send (e.g., transmit) a linking signal to the primary portable device 108 through the communication device(s) 148 that links the primary portable device 108 to the vehicle 102. In an alternate embodiment, the primary device linking module 202 may send a command signal to the TCU 120 of the vehicle 102 to send the linking signal to the primary portable device 108. In addition, the primary device linking module 202 may create and populate one or more corresponding records on the vehicle link table 300 that may be related to the entry associated to the primary driver with the data from the vehicle owner profile that may be associated with one or more respective fields (e.g., user ID, device ID, etc.).

In one embodiment, the primary device linking module 202 may communicate a command signal to the head unit 114 of the vehicle 102 to present a confirmation user interface on the display device 118 within the vehicle 102 that presents a confirmation that the primary portable device 108 has been linked to the vehicle 102. In an alternate embodiment, upon linking the primary portable device 108 to the vehicle 102, the primary device linking module 202 may communicate the command signal to the control unit 130 of the primary portable device 108 and/or to the head unit 114 of the vehicle 102 to present the confirmation user interface on the touch screen display 142 of the primary portable device 108 and/or the display device 118 of the vehicle 102 within the vehicle 102 that presents a confirmation screen that the primary portable device 108 has been linked to the vehicle 102. In some embodiments, the confirmation user interface may include information associated with the primary driver of the vehicle 102.

In an exemplary embodiment, as described in more detail below, when the primary portable device 108 is linked to the vehicle 102 the primary device linking module 202 may communicate a command signal to the control unit 130 of the linked primary portable device 108 to grant the primary portable device 108 with administrative privileges that include privileges for granting a level of accessing the vehicle 102 and a level of enabling of the vehicle 102 to one or more authorized users through their respective secondary portable devices 110.

In an exemplary embodiment, upon linking the primary portable device 108 to the vehicle 102, the primary device linking module 202 may provide the primary driver with a vehicle data provisioning user interface. The vehicle data provisioning user interface may provide the capability for the primary driver to create and update the provisioning file associated with the vehicle 102. In one embodiment, the primary driver may input one or more selection inputs (e.g., radio button icons, check box icon, button icons, etc.) that allow the primary driver to optionally select one or more types of vehicle data to be off-boarded from the vehicle 102 upon the receipt of consent of the terms and conditions from the primary driver and/or the one or more authorized users of the vehicle 102. In some embodiments, the primary driver may also input one or more selection inputs to optionally not select or deselect one or more types of vehicle data that the primary driver chooses not to be off-boarded from the vehicle 102. For example, the primary driver may select the one or more types of vehicle data from the data log of the vehicle 102 to be selected for allowing off-boarding and may unselect types of vehicle data that pertain to geo-location information sharing for disallowing off-boarding of such vehicle data.

In an exemplary embodiment, upon the primary driver utilizing the vehicle data provisioning user interface to select the one or more types of vehicle data to be off-boarded, the primary device linking module 202 may create and/or update the provisioning file associated with the primary driver of the vehicle 102 and store the provisioning file on the storage 146 of the externally hosted server infrastructure 106. In one embodiment, upon the creation of the provisioning file, the provisioning file may be stored specifically within the storage 146 of the parent server cluster of the externally hosted server infrastructure 106. As described below, upon authentication of the primary driver, the primary device linking module 202 may send a command signal to transmit the provisioning file (e.g., the original file or a replica of the provisioning file) to the vehicle 102 in order to be stored and executed by the vehicle link application 104 upon the receipt of consent of the terms and conditions by the primary driver and/or the one or more authorized users.

In an exemplary embodiment, upon creation or update of the provisioning file, the primary device linking module 202 may authenticate the primary driver through the primary portable device 108 before transmitting the provisioning file to the vehicle 102 to be further evaluated and executed by the vehicle link application 104. The primary device linking module 202 may send a signal to the control unit 130 of the primary portable device 108 to present a user ID/password prompt to the primary driver through the touch screen display 142 of the primary portable device 108. Upon receiving the user ID/password that is associated with the primary driver through the user ID/password prompt, the primary device linking module 202 may provide a query on the vehicle link table 300 based on the received user ID/password to confirm the designation of the primary driver. In one embodiment, upon confirming the designation of the primary driver, the primary device linking module 202 may send a command signal to the externally hosted server infrastructure 106 to send an authentication code associated with the provisioning file to the TCU 120 of the vehicle 102 through the communication device(s) 148 of the externally hosted server infrastructure 106.

In an alternate embodiment, upon receiving the user ID/password that is associated with the primary driver and confirming the designation of the primary driver, the primary device linking module 202 may send the command signal specifically to the child server cluster of the externally hosted server infrastructure 106. Upon receiving the command signal, the child server cluster may send the authentication code associated with the provisioning file to the TCU 120 of the vehicle 102 through the communication device(s) 148 of the externally hosted server infrastructure 106.

In one or more embodiments, upon receipt of the authentication code by the TCU 120, the primary device linking module 202 may send a command signal to the head unit 114 of the vehicle 102 to display an authentication code user interface via the display device 118 of the vehicle 102 to the primary driver. The authentication code user interface may present a retrieval interface input (e.g., interface input button) and a corresponding message that directs the primary driver to input (e.g., press) the retrieval interface input to retrieve the authentication code provided by the externally hosted server infrastructure 106 and to further input the authentication code within a corresponding authentication code input interface presented on the touch screen display 142 of the primary portable device 108.

In an exemplary embodiment, the authentication code input interface may include an authentication code prompt through the touch screen display 142 that may be used by the primary driver to input the authentication code received through the primary portable device 108. Upon the receipt of the authentication code (i.e., the authentication code presented to the primary driver through the authentication code user interface presented on the display device 118) based on input of the authentication code by the primary driver through the authentication code prompt through the touch screen display 142, the primary device linking module 202 may send an authentication signal containing the inputted authentication code through the communication device 138 of the primary portable device 108 to the externally hosted server infrastructure 106 to evaluate the inputted code to confirm it is the correct code. The primary device linking module 202 may validate that the received authentication code matches the authentication code previously transmitted from the externally hosted server infrastructure 106 to the TCU 120 of the vehicle 102.

In one embodiment, upon validating that the received authentication code matches the authentication code, the primary device linking module 202 may send a signal to the externally hosted server infrastructure 106 to transmit the provisioning file to the vehicle 102 through the communication device(s) 148. Upon receipt of the provisioning file transmitted from the externally hosted server infrastructure 106, the primary device linking module 202 may store the provisioning file on the storage unit 116 of the vehicle 102 to be evaluated and executed by the vehicle link application 104 upon the receipt of consent of the terms and conditions by the primary driver and/or the one or more authorized users.

In an alternate embodiment, upon the receipt of the authentication code through the authentication code prompt of the authentication code input interface, the primary device linking module 202 may send the authentication signal containing the inputted authentication code through the communication device 138 of the primary portable device 108 to the child server cluster of the externally hosted server infrastructure 106. Upon receipt of the authentication code, the primary device linking module 202 may validate that the received authentication code matches the authentication code previously transmitted from the child server cluster to the TCU 120 of the vehicle 102. As discussed above, in an alternate embodiment, upon creation of the provisioning file by the primary driver the provisioning file may be stored on the storage 146 of the parent server cluster. Therefore, within this embodiment, upon validating that the received authentication code matches the authentication code, the primary device linking module 202 may send a signal to the parent child server cluster to transmit the provisioning file to the vehicle 102 through the communication device(s) 148. Upon transmission of the provisioning file to the vehicle 102, the primary device linking module 202 may store the provisioning file on the storage unit 116 of the vehicle 102 to be evaluated and executed by the vehicle link application 104 upon the receipt of consent of the terms and conditions by the primary driver and/or the one or more authorized users.

Linking of the primary portable device 108 to the vehicle 102 and granting privileges to the primary portable device 108 by the vehicle link application 104 will now be discussed in detail. In one or more embodiments, when the primary driver uses his or her primary portable device 108 to access or enable the vehicle 102, the primary device linking module 202 may determine if more than one portable device is detected with respect to the vehicle 102 such that more than one portable device is connected to the vehicle 102, more than one portable device is determined to be in a surrounding area of the vehicle 102 (e.g., a predetermined area internal and/or external to the vehicle 102), more than one portable device is sending one or more signals within the surrounding area of the vehicle 102, and the like. For example, the primary device linking module 202 may determine if more than one portable device is detected with respect to the vehicle 102 based on if more than one portable device is connected to the vehicle 102 through a GSM, GPRS, Wi-Fi®, WiMax®, Bluetooth®, or LTE® wireless connection. As discussed in more detail below, if the primary device linking module 202 determines that more than one portable device is connected to the vehicle 102, the primary device linking module 202 may send a command signal to the driver identification module 210 of the vehicle link application 104 to identify the driver of the vehicle 102 to determine if the driver of the vehicle 102 is the primary driver.

If the primary driver is the driver of the vehicle 102, the primary device linking module 202 may additionally communicate a command signal to the communication device 138 of the primary portable device 108 to send the device ID of the primary portable device 108 along with a respective vehicle accessing signal or vehicle enabling signal to the TCU 120 of the vehicle 102. Upon receipt of the respective vehicle accessing signal or vehicle enabling signal that includes the device ID of the primary portable device 108, the primary device linking module 202 may query the vehicle link table 300 to determine if a corresponding record exists under the device ID field that includes the device ID of the primary portable device 108.

In one embodiment, if the primary device linking module 202 retrieves the record that includes the device ID of the primary portable device 108, the primary device linking module 202 may send a command signal to the TCU 120 to send (e.g., transmit) a permission signal to the primary portable device 108. In an alternate embodiment, if the primary device linking module 202 retrieves the record that includes the device ID of the primary portable device 108, the primary device linking module 202 may send a command signal to the externally hosted server infrastructure 106 to send the permission signal to the primary portable device 108 through the communication device(s) 148. The permission signal may provide the primary portable device 108 with permanent and unlimited accessing privileges to the vehicle 102 to unlock and lock all of the locations of the vehicle 102 that may include, but are not limited to, the locks of doors, compartments, trunk, hood, and the like of the vehicle 102 without any restrictions with respect to time or usage (time or usage restrictions). The permission signal may also provide the primary portable device 108 with permanent and unlimited enabling privileges to the vehicle 102 to turn on or turn off the vehicle 102 without any time or usage restrictions.

As discussed in more detail below, in one embodiment, upon linking the primary portable device 108 to the vehicle 102, the primary device linking module 202 may also send a linking signal to the data off-boarding consent module 206 that includes data associated with linked primary portable device 108. For example, the respective linking signal may include a device ID of the linked primary portable device 108. Upon receipt of the linking signal, the data off-boarding consent module 206 may communicate a command signal to the control unit 130 of the primary portable device 108 to present a terms and conditions user interface to the primary driver through the touch screen display 142 of the primary portable device 108.

In one or more embodiments, the terms and conditions user interface may include terms and conditions that are related to the off-loading of selected types of vehicle data based on the provisioning file, as discussed above, that may include but is not limited to vehicle identification number (VIN), POI information, geolocation information, data from the data log of the vehicle 102, and the like that may be packaged in the form of different types of vehicle data and transmitted through the TCU 120 of the vehicle 102 to the externally hosted server infrastructure 106. In one embodiment, the terms and conditions user interface may also include one or more user interface input icons that may be associated to an acceptance and/or denial of the terms and conditions. In one embodiment, the terms and conditions user interface may only include the terms and conditions and may also be presented on the display device 118 of the vehicle 102 to include one or more user interface input icons that may be associated to the acceptance and/or denial of the terms and conditions.

In some embodiments, the terms and conditions user interface may additionally include one or more sharing selection icons that are associated with types of vehicle data selected to be shared that are presented based on evaluation of the provisioning file (e.g., vehicle identification number (VIN), Points of Interest (POI) information, geolocation information, specific vehicle system data, data from the data log of the vehicle 102). The primary driver may provide one or more inputs to the sharing selection icons to accept specific consent or deny specific consent of the sharing of one or more selected types of vehicle data to be off-boarded based on the evaluation of the provisioning file. For example, the primary driver may use the terms and conditions user interface to select the acceptance of consent to share the VIN and to select the denial of consent to share the POI information. Upon the acceptance of the terms and conditions via the terms and conditions user interface, the data off-boarding consent module 206 may communicate a command signal to the head unit 114 of the vehicle 102 to present a terms and conditions confirmation user interface that may present a confirmation message that the primary driver has consented to the terms and conditions through his or her primary portable device 108.

In an exemplary embodiment, once the primary portable device 108 is provided with the linking signal granting the administrative privileges through his or her primary portable device 108, the primary device linking module 202 may update records within the entry associated with the primary driver on the vehicle link table 300 with accessing privilege information and enabling privilege information. With reference again to FIG. 3, as shown as an illustrative example, upon creation of the user ID, the entry 312 may be created that is associated with the primary driver of the vehicle 102 and includes a record populated with the user ID of the primary driver (shown as User 1) and a record that is populated with the device ID of the primary portable device 108 (e.g., shown as PHN1). In addition, records may populated with a designation of the user type (e.g., shown as primary), the accessing privilege level (e.g., shown as permanent administrator) and the enabling privilege level (e.g., shown as permanent administrator).

Linking of the at least one secondary portable device 110 to the vehicle 102 and granting privileges to the at least one secondary portable device 110 by the vehicle link application 104 will now be discussed in more detail. With reference again to FIG. 2, in one embodiment, once the primary driver is provided with administrative privileges through his or her primary portable device 108, the primary device linking module 202 may communicate a linking signal to the secondary device linking module 204 that includes data associated with the primary portable device 108. Upon receipt of the linking signal, the secondary device linking module 204 may send a command signal to the control unit 130 of the primary portable device 108 and/or the head unit 114 of the vehicle 102 to present a vehicle administration user interface to the primary driver through the touch screen display 142 of the primary portable device 108 and/or the display device 118 of the vehicle 102. The vehicle administration user interface may be initialized by the primary driver at any time per his or her choosing and provides a means to designate one or more additional persons as one or more authorized users by granting vehicle accessing permissions and/or vehicle enabling permissions to one or more secondary portable devices 110.

In one embodiment, the secondary device linking module 204 may present a plurality of accessing levels of the vehicle accessing permissions and a plurality of enabling levels of the vehicle enabling permissions that may be granted to the one or more respective authorized users by the primary driver. In an exemplary embodiment, the plurality of accessing levels may include usage based vehicle accessing privileges and time based vehicle accessing privileges that may be reflected in one or more designated levels (e.g., levels 1-3). The usage based vehicle accessing privileges may be set by the primary driver to allow the one or more respective authorized users to unlock and lock at least one lock of one or more locations of the vehicle 102 that are determined by the primary driver and classified as predetermined locations of the vehicle 102. The one or more predetermined locations of the vehicle 102 may be set by the primary driver through an authorized user addition user interface. For example, the primary driver may set one or more predetermined locations of a vehicle as a designated sub-set of doors of the vehicle 102 (e.g., only door locks but not compartment and trunk locks) that may be set by the primary driver through the authorized user addition user interface so that the one or more secondary portable devices 110 may only be utilized to unlock or lock the door locks of the vehicle 102.

The time based vehicle accessing privileges may be set by the primary driver to allow the one or more respective authorized users to unlock and lock at least one lock of one or more locations of the vehicle 102 for a determined period of time that is determined by the primary driver and classified as a predetermined period of time. The predetermined period of time may be set by the primary driver through the authorized user addition user interface. For example, the primary driver may set the predetermined period of time as a temporary amount of time such as for a period of three weeks so that the one or more secondary portable devices 110 may only be utilized to access the vehicle 102 for the period of three weeks.

In one embodiment, the plurality of enabling levels may include usage based vehicle enabling levels and time based vehicle enabling levels that may be reflected in one or more designated levels (e.g., levels 1-3). The usage based vehicle accessing privileges may be set by the primary driver to allow the one or more respective authorized users to enable or disable one or more ignition modes of the vehicle 102 (e.g., an ACC mode, a battery ON/OFF mode, an engine ON/OFF mode) that are determined by the primary driver and classified as predetermined ignition modes of the vehicle 102. The one or more predetermined ignition modes of the vehicle 102 may be set by the primary driver through the authorized user addition user interface. For example, the primary driver may set one or more predetermined ignition modes of the vehicle as a battery ON/OFF mode of the vehicle 102 so that the one or more secondary portable devices 110 may only be utilized to enable or disable the battery ON/OFF mode of the vehicle 102.

The time based vehicle enabling privileges may be set by the primary driver to allow the one or more respective authorized users to enable the one or more predetermined ignition modes of the vehicle 102 for a determined period of time that is determined by the primary driver and classified as predetermined period of time. The predetermined period of time may be set by the primary driver through the authorized user addition user interface. For example, the primary driver may set the predetermined period of time as a temporary amount of time such as for a period of three weeks so that the one or more secondary portable devices 110 may only be utilized to enable or disable the predetermined ignition mode of the vehicle 102 for the period of three weeks.

In some embodiments, the primary driver may only grant vehicle accessing privileges to one or more respective authorized users without granting the one or more respective authorized users any vehicle enabling privileges. For example, a secondary driver may be given access to unlock/lock one or more doors of the vehicle 102 from his or her respective secondary portable device 110 without being given the ability to enable/disable any ignition modes from his or her respective secondary portable device 110.

The time based vehicle enabling privileges may be set by the primary driver to allow the one or more respective authorized users to turn on or turn off the ignition of the vehicle 102 for an indefinite/permanent period of time or a temporary period of time (e.g., authorized user has right to enable vehicle indefinitely or only for a period of 3 weeks) that may be set by the primary driver through the authorized user addition user interface.

As an illustrative example, the primary driver may choose to designate a spouse as an authorized user that is granted with a high accessing privilege level and a high enabling privilege level (e.g., level 1) that provide full accessing and enabling privileges that allow the use of his or her secondary portable device 110 to unlock/lock the doors and compartments of the vehicle 102 and/or enable/disable the engine of the vehicle 102 without any restrictions. The primary driver may also designated a friend as an authorized user that is granted with a lower accessing privilege level and/or enabling privilege level (e.g., level 2) that allows the friend to use his or her secondary portable device 110 to restrictively unlock/lock only the doors of the vehicle 102 and/or enable/disable only the a battery ON/OFF ignition mode of the vehicle 102.

In one or more embodiments, upon the primary driver of the vehicle 102 utilizing the vehicle administration user interface to add one or more authorized users of the vehicle 102, the secondary device linking module 204 may communicate respective data to the externally hosted server infrastructure 106 to update the vehicle link table 300 with respective additional entries that are associated with the one or more authorized users. With reference back to FIG. 3, the entries associated to the authorized users 314-322 may include records that are populated with the user ID of the secondary user, the device ID of the secondary user (that may be manually or automatically updated), user type designation, accessing privilege level, and the enabling privilege level.

In an alternate embodiment, one or more additional persons may input a request to be granted vehicle accessing privileges and/or vehicle enabling privileges through his or her respective secondary portable device 110. In particular, the secondary device linking module 204 may include request user interface input (e.g., icon) through a user interface of the vehicle link application 104 that may be presented on one or more secondary portable devices 110. Upon input of the request user interface input by the one or more additional persons, the secondary device linking module 204 may communicate a respective signal to the control unit 130 of the primary portable device 108 to present a request indication user interface to the primary driver through the primary portable device 108. The request indication user interface may indicate the request by one or more additional persons to request vehicle accessing permissions and/or vehicle enabling permissions. The request indication user interface may provide the primary driver a portal to the vehicle administration user interface to grant the vehicle accessing privileges and/or vehicle enabling privileges of his or her choosing in order to designate the one or more additional persons as one or more authorized users of the vehicle 102.

In some embodiments, the secondary device linking module 204 may further validate the one or more authorized users before completing the linking of the one or more secondary portable devices 110. In particular, upon creation of the record(s) associated with the one or more authorized users on the vehicle link table 300, the secondary device linking module 204 may require validation from the primary portable device 108 in order link the one or more secondary portable devices 110 to the vehicle 102. The secondary device linking module 204 may send a signal to the control unit 130 of the primary portable device 108 to send a validation code via the communication device 138 to the communication device(s) 140 of the one or more secondary portable devices 110 to be presented to the one or more respective authorized users through the touch screen display(s) 144. In addition to the validation code, a message may be provided to the one or more authorized users instructing the input of the validation code to a validation code prompt that is presented through the display device 118 within the vehicle 102. Upon the receipt of the correct validation code (i.e., the validation code presented to the one or more authorized users through the one or more respective secondary portable devices 110) through the validation code prompt presented on the display device 118, the secondary device linking module 204 may validate the one or more authorized users and may enable the communication device 138 of the primary portable device 108 to send a respective linking signal to the one or more secondary portable devices 110 of the respective authorized users.

In one or more embodiments, linking of the one or more secondary portable devices 110 to the vehicle 102 allows the communication device(s) 140 of the one or more secondary portable devices 110 to be paired with the TCU 120 of the vehicle 102 to bilaterally communicate a plurality of signals, that may include, but are not limited to vehicle accessing signals, vehicle enabling signals, and user consent signals, among others. In one embodiment, upon linking the one or more secondary portable devices 110 to the vehicle 102, the secondary device linking module 204 may communicate a command signal to the head unit 114 of the vehicle 102 to present a confirmation user interface on the display device 118 within the vehicle 102 that presents a confirmation that the one or more respective secondary portable devices 110 have been linked to the vehicle 102.

In an alternate embodiment, upon linking the one or more secondary portable devices 110 to the vehicle 102, the secondary device linking module 204 may communicate the command signal to the control unit(s) 132 of the one or more secondary portable devices 110 to present the confirmation user interface on the touch screen display(s) 144 that presents the confirmation that the one or more secondary portable devices 110 have been linked to the vehicle 102. In some embodiments, the confirmation user interface may include information associated with the respective authorized user(s) of the vehicle 102.

If the driver of the vehicle 102 is one of the one or more authorized users of the vehicle 102, the secondary device linking module 204 may additionally provide a query on the vehicle link table 300 to determine the accessing privilege level and the enabling privilege level granted to the one or more respective authorized users through their respective secondary portable devices 110 (as granted by the primary driver, as discussed above). Upon querying the vehicle link table 300 and determining the levels, the secondary device linking module 204 may communicate a command signal to communication device 138 of the primary portable device 108 to send (e.g., transmit) a permission signal to the one or more secondary portable devices 110 when the one or more devices 110 are used to access or enable the vehicle 102. Therefore, the primary portable device 108 may facilitate accessing of the vehicle 102 and/or enabling of the vehicle 102 by the one or more secondary portable devices 110 based on the level of accessing privileges and/or enabling privileges granted to the one or more secondary portable devices 110.

In an exemplary embodiment, when the one or more authorized users use their one or more respective secondary portable devices 110 to access and/or enable the vehicle 102, the secondary device linking module 204 may determine if more than one portable device is detected with respect to the vehicle 102 such that more than one portable device is connected to the vehicle 102, more than one portable device is determined to be in a surrounding area of the vehicle 102 (e.g., a predetermined area internal and/or external to the vehicle 102), more than one portable device is sending one or more signals within the surrounding area of the vehicle 102, and the like. For example, the secondary device linking module 204 may determine if more than one portable device is detected with respect to the vehicle 102 based on if more than one portable device is connected to the vehicle 102 through a GSM, a GPRS, Wi-Fi®, WiMax®, Bluetooth®, or LTE® wireless connection. As discussed in more detail below, if the secondary device linking module 204 determines that more than one portable device is connected to the vehicle 102, the secondary device linking module 204 may send a command signal to the driver identification module 210 to identify the driver of the vehicle 102 to determine if the driver of the vehicle 102 is one of the one or more authorized users of the vehicle 102.

In one embodiment, the secondary device linking module 204 may communicate a command signal to the communication device(s) 140 of the one or more respective secondary portable devices 110 to send the device ID(s) of the respective devices 110 along with a respective vehicle accessing signal or vehicle enabling signal to the TCU 120 of the vehicle 102. Upon receipt of the respective vehicle accessing signal or vehicle enabling signal that includes the device ID(s) of the one or more secondary portable devices 110, the secondary device linking module 204 may query the vehicle link table 300 to determine if a corresponding record exists under the device ID field that includes the device IDs of the one or more secondary portable devices 110.

In one embodiment, if the secondary device linking module 204 retrieves the record(s) that includes the device ID(s) of the one or more secondary portable devices 110, the secondary device linking module 204 may send a command signal to the communication device 138 of the primary portable device 108 to send (e.g., transmit) the permission signal(s) to the one or more secondary portable devices 110 used by the respective authorized users. In one embodiment, the permission signal(s) may provide the one or more secondary portable devices 110 with the level of accessing privileges to the vehicle to possibly unlock and lock the locks of doors, compartments, trunk, hood, and the like of the vehicle 102 based on the respective accessing privilege level associated with the user ID of the respective authorized user(s) within the vehicle link table 300, as granted by the primary driver. The permission signal also may provide the one or more respective authorized users with the level of enabling privileges to the vehicle 102 to possibly turn on or turn off the vehicle 102 based on the respective enabling privilege level associated with the user ID of the respective authorized user(s) within the vehicle link table 300, as granted by the primary driver.

As discussed in more detail below, in one embodiment, upon the one or more secondary portable devices 110 being linked to the vehicle 102, the secondary device linking module 204 may send a respective linking signal to the data off-boarding consent module 206 that includes data respective of the one or more linked secondary portable devices 110. For example, the respective linking signal may include a device ID(s) of the one or more linked secondary portable devices 110. Upon receipt of the respective linking signal, the data off-boarding consent module 206 may communicate a command signal to the control unit(s) 132 of the one or more secondary portable devices 110 to present the terms and conditions user interface (similar to the terms and conditions user interface presented to the primary driver, as discussed above) to the respective authorized user(s) through the touch screen display(s) 144. In an alternate embodiment, the data off-boarding consent module 206 may communicate a command signal to the head unit 114 of the vehicle 102 to present the terms and conditions user interface through the display device 118 of the vehicle 102.

Identification of the driver of the vehicle 102 by the driver identification module 210 of the vehicle link application 104 will now be discussed in more detail. In an exemplary embodiment, as discussed above, when the primary driver or the one or more authorized users use the portable device 108 to access and/or enable the vehicle 102, the primary device linking module 202 may determine if more than one portable device is detected with respect to the vehicle 102. If it is determined that more than one portable device is detected with respect to the vehicle 102, the primary device linking module 202 may send a command signal to the driver identification module 210 to identify the driver of the vehicle 102. Similarly, when the one or more authorized users use their one or more respective secondary portable devices 110 to access and/or enable the vehicle 102, the secondary device linking module 204 may determine if more than one portable device 108 is detected with respect to the vehicle 102. If it is determined that more than one portable device is detected with respect to the vehicle 102, the secondary device linking module 204 may send a command signal to the driver identification module 210 to identify the driver of the vehicle 102.

In one embodiment, the primary device linking module 202 or the secondary device linking module 204 may determine that more than one portable device is detected with respect to the vehicle 102 when more than one portable device is connected to the vehicle 102 through a GSM, GPRS, Wi-Fi®, WiMax®, Bluetooth®, or LTE® connection. In another embodiment, the primary device linking module 202 or the secondary device linking module 204 may determine that more than one portable device is detected with respect to the vehicle 102 by communicating the TCU 120 to scan radio frequencies within the surrounding area of the vehicle 102 to determine if more than one portable device exists that is emitting wireless signals (e.g., cellular data signals). In yet another embodiment, the primary device linking module 202 or the secondary device linking module 204 may determine that more than one portable device is detected with respect to the vehicle 102 by communicating with the TCU 120 to determine that the TCU 120 is detecting a plurality of signals that include a plurality of different device IDs that are being emitted within a surround area of the vehicle 102 by more than one portable device.

In one embodiment, upon receiving the command signal to identify the driver of the vehicle 102 from the primary device linking module 202 or the secondary device linking module 204, the driver identification module 210 may utilize various means to identify the driver of the vehicle 102 as the primary driver, one of the one or more authorized users of the vehicle 102, or an unidentified driver of the vehicle 102 to properly grant vehicle accessing privileges and enabling privileges and off-board data (e.g., pertaining to the driver) from the vehicle 102.

In an exemplary embodiment, when multiple portable devices are connected to the vehicle 102 via a GSM, GPRS, Wi-Fi®, WiMax®, Bluetooth®, or LTE® (e.g., to provide a hands free calling and/or audio sharing connection), the driver identification module 210 may communicate with the TCU 120 to additionally communicate a command signal to the communication devices of the multiple connected portable devices to send the device IDs of the multiple connected portable devices to the TCU 120 of the vehicle 102. Upon receipt of the devices IDs of the multiple connected portable devices, the driver identification module 210 may query the vehicle link table 300 to determine if a record exists under the device ID field that includes the device ID of the primary portable device 108 or at least one secondary portable device 110 of the one or more secondary portable devices 110.

In one or more embodiments, if the device ID of the primary portable device 108 matches the device ID received from one of the multiple connected portable devices the driver identification module 210 may determine that the driver of the vehicle 102 is the primary driver. Similarly, if the device ID of at least one of the one or more secondary portable devices 110 matches the device ID received from one or the multiple connected portable devices, the driver identification module 210 may determine that the driver of the vehicle 102 is one of the one or more authorized users of the vehicle 102. However, if the device ID of the primary portable device 108 and the at least one of the one or more secondary portable devices 110 does not match the device IDs received from the multiple connected portable devices, the driver identification module 210 may identify the driver of the vehicle 102 as the unidentified driver. In one embodiment, upon identifying the driver of the vehicle 102 as the unidentified driver, the driver identification module 210 may send a signal to the communication device 138 of the primary portable device 108 to provide a notification and input icon through the touch screen display 142 to optionally present the vehicle administration interface to link the portable device of the unidentified driver as a secondary portable device 110 to the vehicle 102. In one embodiment, if multiple device IDs of the primary portable device 108 and/or the one or more secondary portable devices 110 match the device IDs received from multiple connected portable devices, the driver identification module 210 may utilize additional means to determine the identity of the driver, as discussed within one or more embodiments below.

In one embodiment, when multiple portable devices are determined to exist that are emitting wireless signals, the driver identification module 210 may communicate with the TCU 120 to determine signal strengths of wireless connection signals (e.g., GSM, GPRS, Wi-Fi®, WiMax®, Bluetooth®, or LTE®) between the connected portable devices and the TCU 120. More specifically, the driver identification module 210 may utilize a range of predetermined signal strength threshold values that correspond with a range of predetermined signal strength values of signals of portable devices that are likely to be located within one or more predetermined locations of the vehicle 102 where the driver of the vehicle 102 is likely to be located (e.g., driver's seat of the vehicle 102, outside the driver side door of the vehicle 102).

In particular, the driver identification module 210 may communicate with the TCU 120 to determine respective signal strengths of the multiple portable devices connected to the vehicle 102 to determine at least one portable device emitting a signal with a signal strength that is within the range of predetermined signal strength threshold values. Upon determining the at least one portable device that is emitting the signal with the signal strength that is within the range of predetermined signal strength threshold values, the driver identification module 210 may communicate a command signal to the at least one portable device to communicate the device ID of the portable device to the driver identification module 210. Upon receipt the device ID of the at least one portable device, the driver identification module 210 may query the vehicle link table 300 to determine if a corresponding record exists under the device ID field that includes the device ID of the primary portable device 108 or one of the one or more secondary portable devices 110.

In one or more embodiments, if the device ID of the primary portable device 108 matches the device ID received from the at least one portable device with the signal strength that is within the range of predetermined signal strength threshold values, the driver identification module 210 may determine that the driver of the vehicle 102 is the primary driver. Similarly, if the device ID of one of the one or more secondary portable devices 110 matches the device ID received from the at least one portable device with the signal strength that is within the range of predetermined signal strength threshold values, the driver identification module 210 may determine that the driver of the vehicle 102 is one of the one or more authorized users of the vehicle 102. If the device ID of the primary portable device 108 and one of the one or more secondary portable devices 110 does not match the device ID received from the at least one portable device with the signal strength that is within the range of predetermined signal strength thresholds, the driver identification module 210 may identify the driver of the vehicle 102 as the unidentified driver.

In one embodiment, upon identifying the driver of the vehicle 102 as the unidentified driver, the driver identification module 210 may send a signal to the communication device 138 of the primary portable device 108 to provide a notification and input icon through the touch screen display 142 to optionally present the vehicle administration interface to link the portable device of the unidentified driver as a secondary portable device 110 to the vehicle 102. In one embodiment, if multiple device IDs of the primary portable device 108 and/or the one or more secondary portable devices 110 match the device IDs received from multiple portable devices with the signal strength that is within the range of predetermined signal strength thresholds, the driver identification module 210 may utilize additional means to determine the identity of the driver, as discussed within the embodiments below.

In an alternate embodiment, the driver identification module 210 may utilize the vehicle camera system 128 to capture one or more images of the primary driver and/or the one or more authorized users of the vehicle 102 upon linking their respective primary portable device 108 and/or respective secondary portable device(s) 110 to the vehicle 102. Upon capturing the one or more images of the primary driver and/or the one or more authorized users the driver identification module 210 may convert the images into a data format and integrate the data within the driver profile associated with the primary driver and/or the one or more authorized users of the vehicle 102.

In the occasion that more than one portable device is detected respective to the vehicle 102, the driver identification module 210 may utilize the vehicle camera system 128 to capture one or more images of the driver of the vehicle 102 when the driver of the vehicle 102 is determined to be seated within a driver's seat of the vehicle 102. Upon capturing the one or more images of the driver of the vehicle 102, the driver identification module 210 may access the driver profile(s) associated with the primary driver and/or the one or more authorized users of the vehicle 102 and may apply facial recognition logic to determine if the one or more images of the driver of the vehicle 102 match with images integrated within the driver profile(s). In one or more embodiments, if the driver identification module 210 determines a facial recognition match between the one or more images of the driver of the vehicle 102 and the one or more images of the primary driver of the vehicle 102 integrated within the driver profile of the primary driver, the driver identification module 210 may determine that the driver of the vehicle 102 is the primary driver.

Similarly, if the driver identification module 210 determines a facial recognition match between the one or more images of the driver of the vehicle 102 and the one or more images of one of the one or more authorized users of the vehicle 102 integrated within the driver profile of one of the one or more authorized users of the vehicle 102, the driver identification module 210 may determine that the driver of the vehicle 102 is one of the one or more authorized users of the vehicle 102. In the event that the driver identification module 210 does not determine a facial recognition match between the one or more images of the driver of the vehicle 102 and the one or more images within any of the driver profiles, the driver identification module 210 may identify the driver of the vehicle 102 as the unidentified driver. The driver identification module 210 may send a signal to the communication device 138 of the primary portable device 108 to provide a notification and input icon through the touch screen display 142 to optionally present the vehicle administration interface to link the portable device of the unidentified driver as a secondary portable device 110 to the vehicle 102.

In an additional embodiment, the driver identification module 210 may utilize the plurality of vehicle systems 122 and/or the plurality of vehicle sensors 124 to capture vehicle dynamic data for a predetermined period of time that is associated with the primary driver and/or the one or more authorized users of the vehicle 102 upon linking their respective primary portable device 108 and/or respective secondary portable device(s) 110 to the vehicle 102. The vehicle dynamic data may include driving behavioral patterns associated with the primary driver and/or the one or more authorized users that includes, but is not limited to, vehicle accelerating patterns, vehicle braking patterns, vehicle gear shifting patterns, vehicle steering patterns, vehicle infotainment usage patterns, vehicle environmental (e.g., seat, lighting, temperature control, mirrors) setting patterns, etc. Upon capturing the vehicle data for the predetermined period of time that is associated with the primary driver and/or the one or more authorized users, the driver identification module 210 may integrate the data with the driver profile associated with the primary driver and/or the one or more authorized users of the vehicle 102.

In the occasion that more than one portable device is detected with respect to the vehicle 102, the driver identification module 210 may utilize the plurality of vehicle systems 122 and/or the plurality of vehicle sensors 124 to capture vehicle dynamic data that is associated with the driver of the vehicle 102 for a predetermined period of time. Upon capturing the vehicle dynamic data that is associated with the driver of the vehicle 102 for the predetermined period of time, the driver identification module 210 may access the driver profile(s) associated with the primary driver and/or the one or more authorized users of the vehicle 102 and may apply driving behavioral pattern matching logic to determine if the driving profile(s) include vehicle dynamic data that matches (e.g., is within an acceptable margin of error) the vehicle dynamic data associated with the driver of the vehicle 102. In one or more embodiments, if the driver identification module 210 determines that the vehicle dynamic data associated with the driver of the vehicle 102 matches the vehicle dynamic data associated with the primary driver of the vehicle 102 integrated within the driver profile of the primary driver, the driver identification module 210 may determine that the driver of the vehicle 102 is the primary driver. In other words, if the driver identification module 210 determines a match between the driving behavioral pattern of the driver of the vehicle 102 and the driving behavioral pattern stored associated with the primary driver of the vehicle 102, the driver identification module 210 may determine that the driver of the vehicle is the primary driver.

Similarly, if driver identification module 210 determines that the vehicle dynamic data associated with the driver of the vehicle 102 matches the vehicle dynamic data associated with the one or the one or more authorized users of the vehicle 102 integrated within the driver profile of one of the one or more authorized users, the driver identification module 210 may determine that the driver of the vehicle 102 is one of the one or more authorized users of the vehicle 102. In other words, if the driver identification module 210 determines a match between the driving behavioral pattern of the driver of the vehicle 102 and the driving behavioral pattern stored associated with one of the one or more authorized users, the driver identification module 210 may determine that the driver of the vehicle is the one of the one or more authorized users of the vehicle 102. In the event that the driver identification module 210 does not determine a vehicle dynamic data match between the vehicle dynamic data associated with the driver of the vehicle 102 and the vehicle dynamic data integrated within any of the driving profiles, the driver identification module 210 may identify the driver of the vehicle 102 as the unidentified driver. The driver identification module 210 may send a signal to the communication device 138 of the primary portable device 108 to provide a notification and input icon through the touch screen display 142 to optionally present the vehicle administration interface to link the portable device of the unidentified driver as a secondary portable device 110 to the vehicle 102.

In some embodiments, the driver identification module 210 may utilize the plurality of vehicle sensors 124 and/or the plurality of vehicle systems 122 to capture driver biometric data for a predetermined period of time that is associated with the primary driver and/or the one or more authorized users of the vehicle 102 upon linking their respective primary portable device 108 and/or respective secondary portable device(s) 110 to the vehicle 102. For instance, the plurality of vehicle sensors 124 may include various biometric sensing sensors that may be located at different portions of the vehicle 102 including but not limited to the driver's seat of the vehicle 102, a center console of the vehicle 102, a steering wheel of the vehicle 102, etc. and/or the plurality of vehicle systems 122 including the vehicle camera system 128 may be utilized to capture biometric data associated with the driver of the vehicle 102. Additionally, in one or more embodiments, the driver identification module 210 may communicate with one or more external biometric sensing wearable devices (not shown) to capture driver biometric data for a predetermined period of time that is associated with the primary driver and/or the one or more authorized users of the vehicle 102.

The biometric data captured by the driver identification module 210 from one or more of the aforementioned components may include various types of physiological data that may be received from the plurality of vehicle sensors 124 and/or the plurality of vehicle systems 122 that include, but are not limited to, heart information, such as, heart rate, blood pressure, blood flow, oxygen content, brain information, such as, functional near infrared spectroscopy (fNIRS), respiration rate information, iris size, pupil dilatation as well as other kinds of information related to the autonomic nervous system or other biological systems of the driver of the vehicle 102. Upon capturing the biometric data for the predetermined period of time that is associated with the primary driver and/or the one or more authorized users, the driver identification module 210 may integrate the data with the driver profile associated with the primary driver and/or the one or more authorized users of the vehicle 102.

In the occasion that more than one portable device is detected with respect to the vehicle 102, the driver identification module 210 may utilize the plurality of vehicle sensors 124 and/or the plurality of vehicle systems 122 to capture driver biometric data that is associated with the driver of the vehicle 102 for a predetermined period of time. Upon capturing the driver biometric data that is associated with the driver of the vehicle 102 for the predetermined period of time, the driver identification module 210 may access the driver profile(s) associated with the primary driver and/or the one or more authorized users of the vehicle 102 and may apply driver biometric matching logic to determine the driver profile(s) include driver biometric data that matches (e.g., is within an acceptable margin of error) the driver biometric data associated with the driver of the vehicle 102. In one or more embodiments, if the driver identification module 210 determines that the driver biometric data associated with the driver of the vehicle 102 matches the driver biometric data associated with the primary driver of the vehicle 102 integrated within the driver profile of the primary driver, the driver identification module 210 may determine that the driver of the vehicle 102 is the primary driver. In other words, if the driver identification module 210 determines a match between the one or more types of physiological data associated with the driver of the vehicle 102 and the one or more types of physiological data associated with the primary driver of the vehicle 102, the driver identification module 210 may determine that the driver of the vehicle is the primary driver.

Similarly, if driver identification module 210 determines that the driver biometric data associated with the driver of the vehicle 102 matches the driver biometric data associated with one of the one or more authorized users of the vehicle 102 integrated within the driver profile of one of the one or more authorized users, the driver identification module 210 may determine that the driver of the vehicle 102 is one of the one or more authorized users of the vehicle 102. In other words, if the driver identification module 210 determines a match between the one or more types of physiological data associated with the driver of the vehicle 102 and the one or more types of physiological data associated with one of the one or more authorized users, the driver identification module 210 may determine that the driver of the vehicle is the one of the one or more authorized users of the vehicle 102. In the event that the driver identification module 210 does not determine a driver biometric data match between the driver biometric data associated with the driver of the vehicle 102 and the driver biometric data integrated within any of the driving profiles, the driver identification module 210 may identify the driver of the vehicle 102 as the unidentified driver. The driver identification module 210 may send a signal to the communication device 138 of the primary portable device 108 to provide a notification and input icon through the touch screen display 142 to optionally present the vehicle administration interface to link the portable device of the unidentified driver as a secondary portable device 110 to the vehicle 102.

Controlling the vehicle 102 to enable data off-boarding of vehicle data will now be discussed in more detail. In an exemplary embodiment, upon the data off-boarding consent module 206 receiving consent of the terms and conditions associated with the vehicle data off-boarding through the primary portable device 108 and/or one or more secondary portable devices 110, the data off-boarding consent module 206 may send a respective consent signal to the data off-boarding control module 208 indicative of the consent of the terms and conditions. Upon receipt of the consent signal, the data off-boarding control module 208 may access the provisioning file from the storage unit 116 of the vehicle 102 for evaluation. In one embodiment, when the provisioning file is accessed by the data off-boarding control module 208 an access timestamp (e.g., date and time) may be integrated within the provisioning file. In another embodiment, when the provisioning file is accessed by the data off-boarding control module 208 the data off-boarding control module 208 may create a record within the vehicle link table 300 that contains the access timestamp (not shown) within the entry that is associated with the primary driver of the vehicle 102.

In one embodiment, upon accessing the provisioning file, the data off-boarding control module 208 may evaluate the provisioning file to determine the one or more types of vehicle data that are selected to be off-boarded from the vehicle 102 by the primary driver. Upon evaluation of the provisioning file, the data off-boarding control module may send an execution signal to the head unit 114 of the vehicle 102 and/or the ECU 112 of the vehicle 102 to enable the off-boarding of the selected one or more types of vehicle data. Upon receipt of the execution signal, the head unit 114 and/or the ECU 112 of the vehicle 102 may send a command to the TCU 120 of the vehicle 102 to enable off-boarding of the selected one or more types of vehicle data to the externally hosted server infrastructure 106.

In one embodiment, upon receiving the command, the TCU 120 may retrieve the one or more selected types of vehicle data from the storage unit 116 and/or receive the one or more selected types of vehicle data from the plurality of vehicle systems 122 to be off-boarded. More specifically, the TCU 120 may communicate (e.g., transmit) the one or more selected types of vehicle data to the communication device(s) 148 to of the externally hosted server infrastructure 106 to be stored within the storage 146 or further utilized by one or more parties (e.g., third-party institutions, vehicle manufacturers, social media services, vehicle navigational services, vehicle maintenance services, traffic maintenance services, rental agencies, etc.)

In one or more embodiments, the vehicle link application 104 may perform a periodic utilization check to determine if the vehicle link application 104 has been utilized by the primary driver and/or the one or more authorized users of the vehicle 102 within a predetermined period of time. In particular, the primary device linking module 202 may periodically check if the vehicle link application 104 has been unutilized for a predetermined period of time (e.g., 10 days) by the primary driver to access and/or enable the vehicle 102. Similarly the secondary device linking module 204 may periodically check if the vehicle link application 104 has been unutilized for a predetermined period of time (e.g., 30 days) by the one or more authorized users of the vehicle 102 to access and/or enable the vehicle 102. If the primary device linking module 202 and/or the secondary device linking module 204 determines that the vehicle link application 104 has been unutilized for the predetermined period of time, the primary device linking module 202 and/or the secondary device linking module 204 may respectively send a signal to the head unit 114 and/or ECU 112 to access the provisioning file that is associated with the vehicle 102 from the storage unit 116.

In an exemplary embodiment, upon accessing the provisioning file, the primary device linking module 202 and/or the secondary device linking module 204 may evaluate the time stamp integrated within provisioning file by the data off-boarding control module 208 to determine if the provisioning file was accessed within a predetermined amount of accessing time (e.g., 30 days). In another embodiment, the primary device linking module 202 and/or the secondary device linking module 204 may evaluate the time stamp contained within the record within the vehicle link table 300 within the entry that is associated with the primary driver as created by the data off-boarding control module 208 to determine if the provisioning file was accessed within the predetermined amount of accessing time. In an illustrative example, a determination that the provisioning file was not accessed within the predetermined amount of accessing time may suggest that the primary driver of the vehicle 102 may no longer be the vehicle owner of the vehicle 102.

In an exemplary embodiment, upon evaluating the provisioning file and determining that it was not accessed within the predetermined period of time, the primary device linking module 202 may send a signal to the communication device 138 of the primary portable device 108 to present a notification to the primary driver to authenticate himself or herself (again) through the primary portable device 108, as discussed above. If the primary driver does not authenticate himself/herself, the primary device linking module 202 may purge the vehicle link table 300 and require the vehicle owner to identify himself or herself as the (new) primary driver and setup a (new) linking process that allows the primary driver to link his or her primary portable device 108 to the vehicle 102 by providing a vehicle owner profile creation user interface to the primary driver.

III. Exemplary Methods Utilized by the Vehicle Link Application

Figure 4:
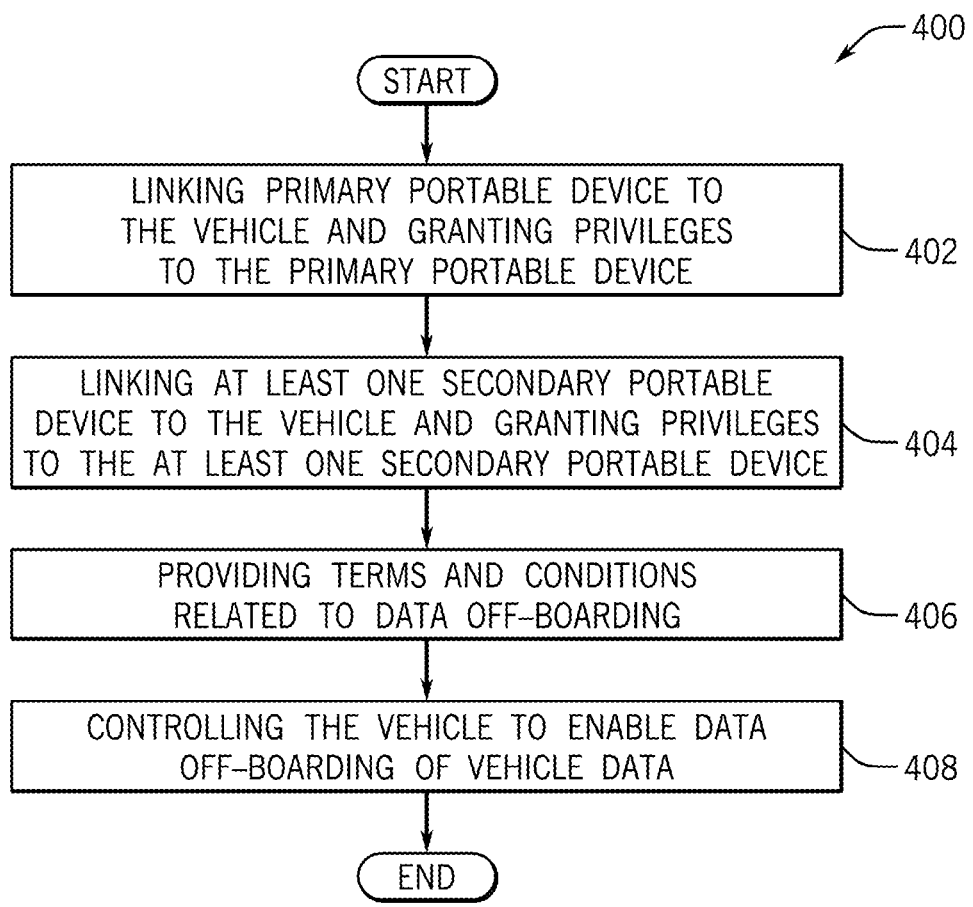
FIG. 4 is an illustrative process flow diagram utilized during execution of the vehicle link application for providing access to the vehicle and enabling data off-boarding from the operating environment according to an exemplary embodiment.

Referring now to FIG. 4, an illustrative process flow diagram of an exemplary method 400 that is utilized during execution of the vehicle link application 104 for providing access to the vehicle 102 and enabling data off-boarding from the operating environment of FIG. 1 is shown according to an exemplary embodiment. The method 400 begins at block 402, where the method 400 includes linking a primary portable device 108 to the vehicle 102 and granting privileges to the primary portable device 108. As discussed above, during a primary driver's initial execution of the vehicle link application 104, the vehicle link application 104 may enable the primary driver to designate himself or herself as the vehicle owner and to link his or her primary portable device 108 to the vehicle 102. The linked primary portable device 108 may be utilized to access and enable the vehicle, and may act as a vehicle access and enabling administrator that may grant access and enabling privileges to the one or more secondary portable devices 110.

Figure 5:
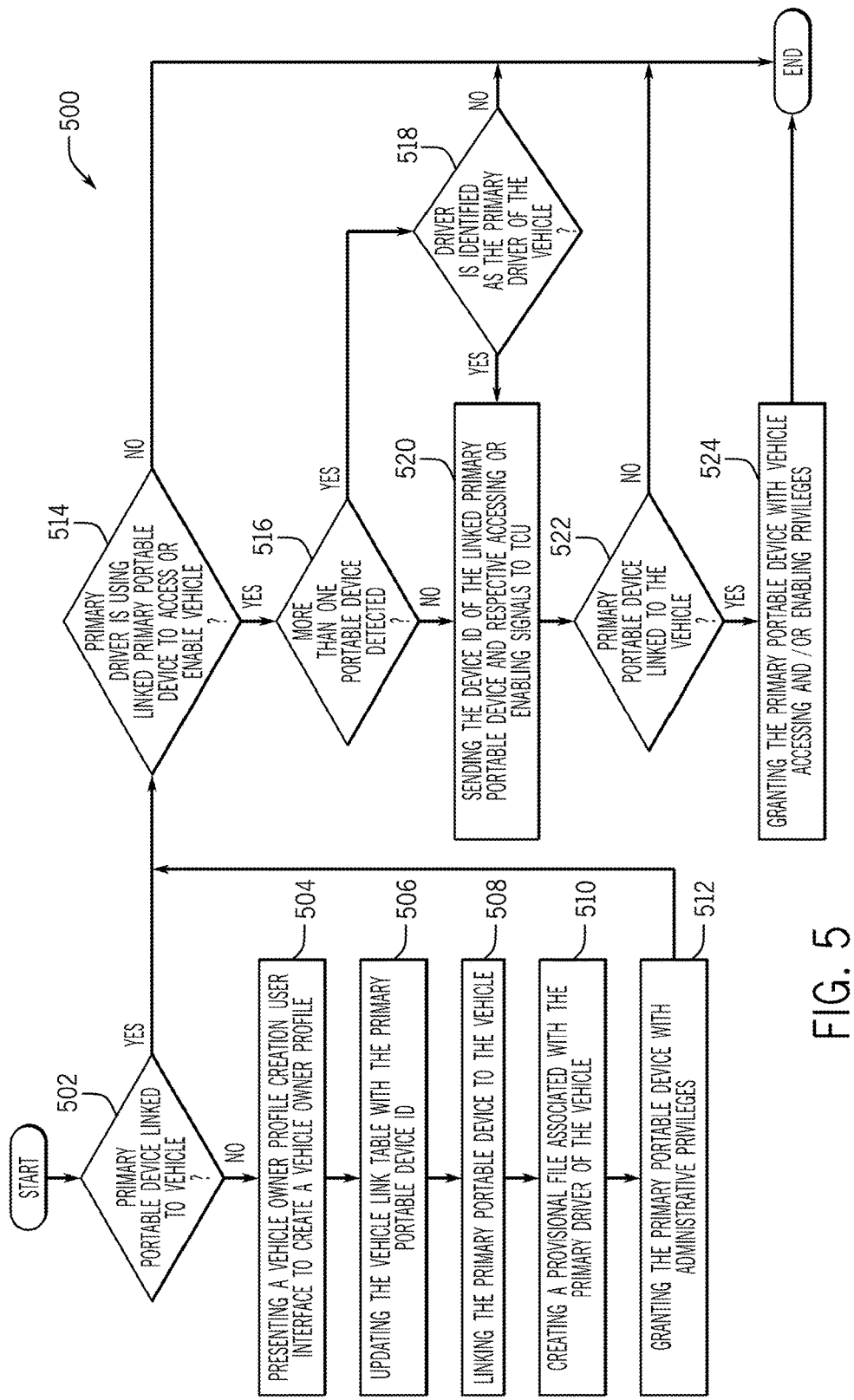
FIG. 5 is an illustrative process flow diagram for linking a primary portable device to the vehicle and granting privileges to the primary portable device according to an exemplary embodiment.

Block 402 will now be described in more detail with reference to FIG. 5. FIG. 5 is an illustrative process flow diagram of an exemplary method 500 for linking a primary portable device 108 to the vehicle 102 and granting privileges to the primary portable device 108. At block 502, the method 500 includes determining if the primary portable device 108 has been linked to the vehicle 102. In an exemplary embodiment, when the vehicle link application 104 is being used by the primary driver via his or her primary portable device 108, the primary device linking module 202 of the vehicle link application 104 may query the vehicle link table 300 residing on the externally hosted server infrastructure 106 to initially determine if a record exists that contains the device ID of the primary portable device 108. If the primary device linking module 202 determines that the record exists that contains the device ID of the primary portable device 108, the primary device linking module 202 may further determine that the primary portable device 108 has been linked to the vehicle 102. Alternatively, if the primary device linking module 202 determines that the record does not exist that contains the device ID of the primary portable device 108, the primary device linking module 202 may further determine that the primary portable device 108 has not been linked to the vehicle 102.

If it is determined that the primary portable device 108 has not been linked (at block 502), at block 504, the method 500 includes presenting a vehicle owner profile creation user interface to create a vehicle owner profile. In one embodiment, the primary device linking module 202 may present the vehicle owner profile creation user interface that may be utilized by the primary driver to create the vehicle owner profile. The vehicle owner profile allows the vehicle link application 104 to classify the primary driver as the vehicle owner and as an administrator to the vehicle 102. In one embodiment, the vehicle owner profile creation user interface may provide capability for the primary driver to create a user account with a user ID and password associated with the primary driver and may manually or automatically input the device ID of the primary portable device 108 within the vehicle owner profile. In one embodiment, the primary device linking module 202 may send a command signal to the externally hosted server infrastructure 106 to send (e.g., transmit) a linking signal to the primary portable device 108 through the communication device(s) 148 that links the primary portable device 108 to the vehicle 102. In an alternate embodiment, the primary device linking module 202 may send a command signal to the TCU 120 of the vehicle 102 to send the linking signal to the primary portable device 108.

At block 506, the method 500 includes updating the vehicle link table 300 with the primary portable device ID. In one embodiment, the primary device linking module 202 may store the vehicle owner profile within the vehicle data link repository 150 and may create an entry on the vehicle link table 300 with one or more records that are associated to the primary driver and/or the primary portable device 108. Moreover, the one or more records may be populated with data from the vehicle owner profile that may include, but is not limited to, the device ID associated with the primary portable device 108 and/or the user ID associated with the primary user.

At block 508, the method 500 includes linking the primary portable device 108 to the vehicle 102. In one embodiment, the primary device linking module 202 may send a linking signal to the communication device 138 of the primary portable device 108 and the TCU 120 of the vehicle 102 to link (e.g., pair) the primary portable device 108 to the vehicle 102.

At block 510, the method 500 includes creating a provisioning file associated with the primary driver of the vehicle 102. In an exemplary embodiment, upon linking the primary portable device 108 to the vehicle 102, the primary device linking module 202 may provide the primary driver with a vehicle data provisioning user interface. As discussed, the vehicle data provisioning user interface may provide the capability for the primary driver to create and update a provisioning file associated with the primary driver of the vehicle 102 based on the input of one or more selection inputs that allow the primary driver to optionally select one or more types of vehicle data to be off-boarded from the vehicle 102. In one embodiment, upon the primary driver utilizing the vehicle data provisioning user interface to select the one or more types of vehicle data to be off-boarded, the primary device linking module 202 may create and/or update the provisioning file associated with the primary driver of the vehicle 102 and store the provisioning file on the storage 146 of the externally hosted server infrastructure 106.

The primary device linking module 202 may send a signal to the control unit 130 of the primary portable device 108 to present a user ID/password prompt to the primary driver through the touch screen display 142 of the primary portable device 108. Upon receiving the user ID/password that is associated with the primary driver, the primary device linking module 202 may provide a query on the vehicle link table 300 based on the user ID/password to confirm the designation of the primary driver. In one embodiment, upon confirming the designation of the primary driver, the primary device linking module 202 may send a command signal to the externally hosted server infrastructure 106 to send the authentication code associated with the provisioning file to the vehicle 102 through the communication device(s) 148 of the externally hosted server infrastructure 106.

In an exemplary embodiment, the primary device linking module 202 may present the authentication code input interface that may include the authentication code prompt through the touch screen display 142 of the primary portable device 108. Upon receipt of the authentication code, the primary device linking module 202 may validate that the received authentication code matches the authentication code previously transmitted from the externally hosted server infrastructure 106 to the TCU 120 of the vehicle 102. Upon validating that the received authentication code matches the authentication code, the primary device linking module 202 may send a signal to the externally hosted server infrastructure 106 to transmit the provisioning file to the vehicle 102 through the communication device(s) 148. Upon receipt of the provisioning file transmitted from the externally hosted server infrastructure 106, the primary device linking module 202 may store the provisioning file on the storage unit 116 of the vehicle 102 to be executed by the TCU 120 and/or the head unit 114 upon the receipt of consent of the terms and conditions by the primary driver and/or the one or more authorized users.

At block 512, the method 500 includes granting the primary portable device 108 with administrative privileges. In one embodiment, when the primary portable device 108 is linked to the vehicle 102 the primary device linking module 202 may communicate a command signal to the control unit 130 of the linked primary portable device 108 to grant the primary portable device 108 with administrative privileges. As discussed the administrative privileges includes privileges for granting a level of access the vehicle 102 and/or a level of enabling of the vehicle 102 to one or more secondary portable devices 110.

Referring again to block 502, if is it determined that the primary portable device has been linked and/or the primary portable device 108 is granted with administrative privileges at block 510, the method 500 proceeds to block 514 and includes determining if the primary driver is using the linked primary portable device 108 to access or enable the vehicle 102. In one embodiment, the primary driver may input one or more respective user interface icons related to accessing privileges associated with the vehicle 102 (e.g., unlock/lock icons) and/or enabling privileges associated with the vehicle 102 (e.g., enabling one or more ignition modes of the vehicle 102/disabling one or more ignition modes of the vehicle 102). For example, the primary driver may use the user interface icons to unlock one or more doors of the vehicle 102 or enable a vehicle engine ON ignition mode of the vehicle 102. The primary device linking module 202 may acknowledge the primary driver's use of the linked primary portable device 108 to access and/or enable the vehicle 102 based on the input of the one or more respective user interface icons to determine that the primary driver is using the linked primary portable device 108 to access or enable the vehicle 102.

If it is determined that the primary driver is using the linked primary portable device 108 to access or enable the vehicle 102 (at block 514), the method 500 proceeds to block 516 where the method 500 includes determining if more than one portable device is detected. In one embodiment, the primary device linking module 202 may determine if more than one portable device is detected with respect to the vehicle 102 such that more than one portable device is connected to the vehicle 102, more than one portable device is determined to be in a surrounding area of the vehicle 102 (e.g., a predetermined area internal and/or external to the vehicle 102), more than one portable device is sending one or more signals within the surrounding area of the vehicle 102, and the like. For example, the primary device linking module 202 may determine if more than one portable device is detected with respect to the vehicle 102 based on if more than one portable device is connected to the vehicle 102 through a GSM, a GPRS, Wi-Fi®, WiMax®, Bluetooth®, or LTE® wireless connection.

If more than one portable device is detected (at block 516), at block 518, the method 500 includes determining if the driver is identified as the primary driver of the vehicle 102. If the primary device linking module 202 determines that more than one portable device is connected to the vehicle 102, the primary device linking module 202 may send a command signal to the driver identification module 210 to identify the driver of the vehicle 102 to determine if the driver of the vehicle 102 is the primary driver. As discussed in detail above, the driver identification module 210 may utilize various techniques to identify the driver of the vehicle 102 as the primary driver of the vehicle 102, one of the one or more authorized users of the vehicle 102, or the unidentified driver of the vehicle 102. For example, in one embodiment, when multiple portable devices are connected to the vehicle 102 the driver identification module 210 may communicate with the TCU 120 to additionally communicate a command signal to the communication devices of the multiple connected portable devices to send the device IDs of the multiple connected portable devices to the TCU 120 of the vehicle 102. Upon receipt of the devices IDs of the multiple connected portable devices, the driver identification module 210 may query the vehicle link table 300 to determine if a record exists under the device ID field that includes the device ID of the primary portable device 108.

If it is determined that more than one portable device is not detected (at block 516) or that the driver is identified as the primary driver of the vehicle 102 at (block 518), the method 500 proceeds to block 520 where the method 500 includes sending the device ID of the linked primary portable device 108 and respective accessing or enabling signals to the TCU 120. In one embodiment, the primary device linking module 202 may communicate a command signal to the communication device 138 of the primary portable device 108 to send the device ID of the primary portable device 108 along with a respective vehicle accessing signal or vehicle enabling signal to the TCU 120 of the vehicle 102.

At block 522, the method 500 includes determining if the primary portable device 108 is linked to the vehicle 102. This step may provide a measure of security to ensure that the primary portable device 108 has been linked to the vehicle 102 in situations when the vehicle link application 104 has not been utilized for a predetermined period of time (e.g., 10 days) by the primary driver of the vehicle 102. Therefore, when the primary driver utilizes his or her primary portable device 108 to access or enable the vehicle 102, the primary device linking module 202 may perform the query to determine if the primary portable device 108 has been linked to the vehicle 102. In one embodiment, upon receipt of the vehicle accessing signal or vehicle enabling signal that includes the device ID of the primary portable device 108 from the sending conducted at block 520, the primary device linking module 202 may query the vehicle link table 300 to determine if a corresponding record exists under the device ID field that contains the device ID of the primary portable device 108. In one embodiment, if the primary device linking module 202 retrieves the record that includes the device ID of the primary portable device 108, the primary device linking module 202 may determine that primary portable device 108 has been linked to the vehicle 102.

If it is determined that the primary portable device 108 has been linked to the vehicle 102 (at block 522), at block 524, the method 500 proceeds to grant the primary portable device 108 with vehicle accessing and/or enabling privileges. In an exemplary embodiment, once the primary device linking module 202 determines that the primary portable device 108 has been linked to the vehicle 102 at block 522, the primary device linking module 202 may send a command signal to the TCU 120 to send (e.g., transmit) a permission signal to the primary portable device 108. The permission signal may provide the primary portable device 108 with permanent and unlimited accessing privileges and enabling privileges to the vehicle 102 and may access and/or enable the vehicle 102 based on the primary driver using the primary portable device 108 to access or enable the vehicle 102 as determined at block 514.

Figure 6:
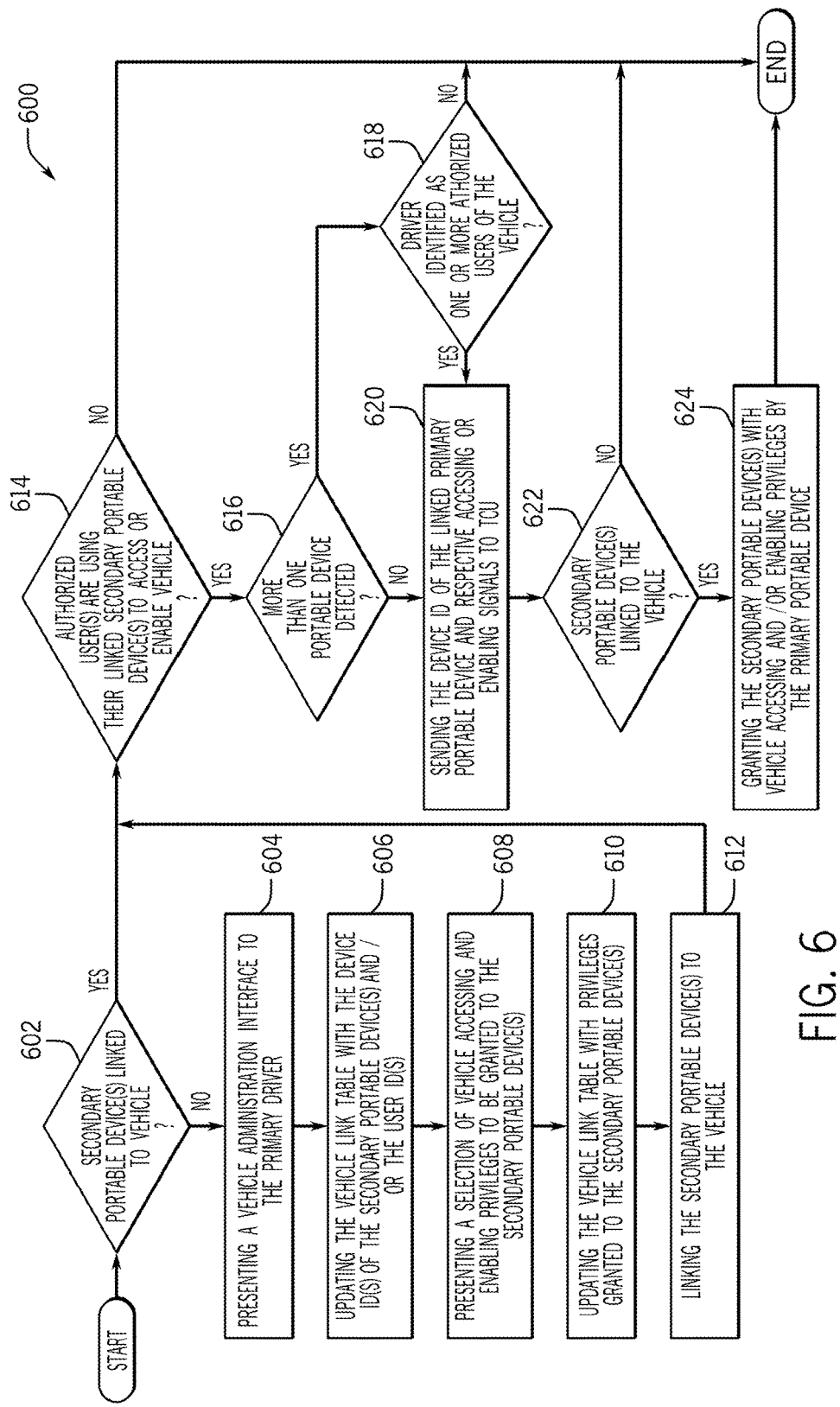
FIG. 6 is an illustrative process flow diagram for linking at least one secondary portable device to the vehicle and granting privileges to the at least one secondary portable device according to an exemplary embodiment.

Referring again to the method 400 of FIG. 4, at block 404, the method 400 includes linking at least one secondary portable device 110 to the vehicle 102 and granting privileges to the at least one secondary portable device 110. Block 404 will now be described in more detail with reference to FIG. 6. FIG. 6 is an illustrative process flow diagram of an exemplary method 600 for linking at least one secondary portable device 110 to the vehicle 102 and granting privileges to the at least one secondary portable device 110.

At block 602, the method 600 includes determining if one or more secondary portable devices 110 is linked to the vehicle 102. In an exemplary embodiment, when the vehicle link application 104 is being used via the one or more secondary portable devices 110, the secondary device linking module 204 of the vehicle link application 104 may query the vehicle link table 300 residing on the externally hosted server infrastructure 106 to determine if a record(s) exists that contains the device ID(s) of the respective secondary portable devices 110. If the secondary device linking module 204 determines that the record(s) exists that contains the device ID(s) of the one or more secondary portable devices 110, the secondary device linking module 204 may further determine that the one or more secondary portable devices 110 have been linked to the vehicle 102. Alternatively, if the secondary device linking module 204 determines that the record(s) does not exist that contains the device ID(s) of the one or more secondary portable devices 110, the secondary device linking module 204 may further determine that the one or more secondary portable devices 110 have not been linked to the vehicle 102.

If it is determined that the one or more secondary portable devices 110 have not been linked to the vehicle 102 (at block 602), at block 604, the method 600 includes presenting a vehicle administration interface to the primary driver. In one embodiment, the secondary device linking module 204 may send a signal to the control unit 130 of the primary portable device 108 and/or the head unit 114 of the vehicle 102 to present the vehicle administration user interface to the primary driver through the touch screen display 142 of the primary portable device 108 and/or the display device 118 of the vehicle 102. In one embodiment, the primary driver may provide inputs to the vehicle administration interface to add one or more authorized users of the vehicle 102 by inputting their associated user ID(s) and the device ID(s) associated with their one or more respective secondary portable devices 110 to be linked to the vehicle 102.

At block 606, the method 600 includes updating the vehicle link table 300 with the device ID(s) of the one or more secondary portable devices 110 and/or the user ID(s) associated with the one or more respective authorized users. In one or more embodiments, upon the primary driver of the vehicle 102 utilizing the vehicle administration user interface to add one or more authorized users and link their respective secondary portable devices 110 to the vehicle 102, the secondary device linking module 204 may communicate respective data to the externally hosted server infrastructure 106 to update the vehicle link table 300 with respective additional entries that are associated with the one or more authorized users. The secondary device linking module 204 may additionally populate one or more records under the user ID field 302 and the device ID field 304 on the vehicle link table 300 associated with the respective additional entries with the user ID(s) that are associated with the one or more authorized users, and/or the device ID(s) that are associated with their one or more respective secondary portable devices 110.

At block 608, the method 600 includes presenting a selection of vehicle accessing and enabling privileges to be granted to the one or more secondary portable devices. In one embodiment, the secondary device linking module 204 may present the plurality of accessing levels of the vehicle accessing permissions and the plurality of enabling levels of the vehicle enabling permissions that may be granted to the one or more secondary portable devices 110 on the vehicle administration interface to the primary driver. The primary driver may provide inputs to the vehicle administration interface to select a respective accessing level and/or enabling level to the one or more respective secondary portable devices 110 to be utilized by the respective one or more authorized users.

At block 610, the method 600 includes updating the vehicle link table 300 with the privileges granted to the one or more secondary portable devices 110. In one or more embodiments, upon the primary driver of the vehicle 102 utilizing the vehicle administration interface to select the level of accessing privileges and/or level of enabling privileges, the secondary device linking module 204 may communicate respective data to the externally hosted server infrastructure 106 to update the vehicle link table 300 within entries that are associated with the one or more authorized users. The secondary device linking module 204 may additionally populate one or more records under the accessing privilege level field 308 and/or the enabling privilege level field 310 on the vehicle link table 300 with the respective accessing and enabling privilege levels granted to the one or more secondary portable devices 110.

At block 612, the method 600 includes linking the one or more secondary portable devices 110 to the vehicle 102. In one embodiment, the secondary device linking module 204 of the vehicle link application 104 may classify the one or more secondary portable devices 110 as linked. The secondary device linking module 204 may then send command signals to the communication device(s) 140 of the linked one or more secondary portable devices 110 and the TCU 120 of the vehicle 102 to pair the one or more linked secondary portable devices 110 to the vehicle 102.

Referring again to block 602, if is it determined that the one or more secondary portable devices 110 have been linked at block 602 or the one or more respective portable devices have been linked to the vehicle 102 at block 612, the method 600 proceeds to block 614 and includes determining if the one or more authorized users are using their linked one or more respective secondary portable devices to access or enable the vehicle 102.

In one embodiment, the one or more authorized users may input one or more respective user interface icons related to accessing privileges associated with the vehicle 102 (e.g., unlock/lock icons) and/or enabling privileges associated with the vehicle 102 (e.g., enabling one or more ignition modes of the vehicle 102/disabling one or more ignition modes of the vehicle 102). The secondary device linking module 204 may acknowledge the one or more authorized users' use of their linked respective secondary portable devices 110 to determine that the one or more authorized users are using their linked one or more respective secondary portable devices 110 to access or enable the vehicle 102.

If it is determined that the one or more authorized users are using their linked one or more respective secondary portable devices to access or enable the vehicle 102 (at block 614), the method 600 proceeds to block 616 where the method 600 includes determining if more than one portable device is detected. In one embodiment, the secondary device linking module 204 may determine if more than one portable device is detected with respect to the vehicle 102 such that more than one portable device is connected to the vehicle 102, more than one portable device is determined to be in a surrounding area of the vehicle 102 (e.g., a predetermined area internal and/or external to the vehicle 102), more than one portable device is sending one or more signals within the surrounding area of the vehicle 102, and the like. For example, the secondary device linking module 204 may determine if more than one portable device is detected with respect to the vehicle 102 based on if more than one portable device is connected to the vehicle 102 through a GSM, a GPRS, Wi-Fi®, WiMax®, Bluetooth®, or LTE® wireless connection.

If more than one portable device is detected (at block 616), at block 618, the method 600 includes determining if the driver is identified as one of the one or more authorized users of the vehicle 102. If the secondary device linking module 204 determines that more than one portable device is connected to the vehicle 102, the secondary device linking module 204 may send a command signal to the driver identification module 210 to identify the driver of the vehicle 102 to determine if the driver of the vehicle 102 is one of the one or more authorized users of the vehicle 102. As discussed in detail above the driver identification module 210 may utilize various techniques to identify the driver of the vehicle 102 as the primary driver of the vehicle 102, one of the one or more authorized users of the vehicle 102, or the unidentified driver of the vehicle 102. For example, in one embodiment, when multiple portable devices are connected to the vehicle 102, the driver identification module 210 may communicate with the TCU 120 to additionally communicate a command signal to the communication devices of the multiple connected portable devices to send the device IDs of the multiple connected portable devices to the TCU 120 of the vehicle 102. Upon receipt of the devices IDs of the multiple connected portable devices, the driver identification module 210 may query the vehicle link table 300 to determine if a record exists under the device ID field that includes the device ID of at least one of the one or more secondary portable devices 110.

If it is determined that more than one portable device is not detected (at block 616) or that the driver is identified as the one of one or more authorized users of the vehicle 102 (at block 618), the method 600 proceeds to block 620 where the method 600 includes sending the device ID(s) of the one or more linked secondary portable devices 110 and respective accessing or enabling signals to the communication device 138 of the primary portable device 108. In one embodiment, the secondary device linking module 204 may communicate a command signal to the communication device(s) 140 of the one or more secondary portable devices 110 to send the device IDs of the one or more respective portable devices 110 along with respective vehicle accessing signal(s) or vehicle enabling signal(s) to the communication device 138 of the primary portable device 108.

At block 622, the method 600 includes determining if the one or more secondary portable device(s) 110 are linked. This step may provide a measure of security to ensure that the one or more secondary portable devices 110 have been linked to the vehicle 102 in situations when the vehicle link application 104 has not been utilized for a predetermined period of time (e.g., 30 days) by the one or more authorized users of the vehicle 102. Therefore, when the one or more authorized users utilize their respective secondary portable devices 110 to access or enable the vehicle 102, and respective vehicle accessing signal(s) or vehicle enabling signal(s) are sent to the communication device 138 of the primary portable device 108, the secondary device linking module 204 may perform the query to determine if the one or more secondary portable devices 110 have been linked to the vehicle 102. In one embodiment, upon receipt of the vehicle accessing signal or vehicle enabling signal that includes the device ID(s) of the one or more secondary portable devices 110 by the communication device 138 (at block 618), the secondary device linking module 204 may send a signal to the communication device 138 to communicate a command signal to the communication device(s) 148 to perform a query on the vehicle link table 300 to determine if a corresponding record(s) exists under the device ID field that contains the device ID(s) of the one or more secondary portable devices 110. In one embodiment, if the secondary device linking module 204 retrieves the record(s) that includes the device ID(s) of the secondary portable devices 110, the secondary device linking module 204 may determine that the one or more secondary portable devices 110 have been linked to the vehicle 102.

If it is determined that the one or more secondary portable devices 110 have been linked to the vehicle 102 (at block 622), at block 624, the method 600 includes granting the one or more secondary portable devices 110 with vehicle accessing and/or vehicle enabling privileges by the primary portable device 108. In an exemplary embodiment, once the secondary device linking module 204 determines that the one or more secondary portable devices 110 have been linked to the vehicle 102 at block 622, the secondary device linking module 204 may send a command signal(s) to the communication device 138 to send (e.g., transmit) a permission signal to the one or more secondary portable devices 110. The permission signal may provide the one or more secondary portable devices 110 with accessing privileges and enabling privileges to the vehicle 102 based on the level of accessing privileges and/or enabling privileges granted by the primary driver (at block 608). The secondary device linking module 204 may enable the communication device(s) 140 to send accessing signals to the TCU 120 of the vehicle 102 upon input of the one or more respective user interface icons related to accessing privileges associated with the vehicle 102 to possibly unlock and lock the predetermined locations of the vehicle 102 based the respective accessing privilege level associated to the one or more secondary portable devices 110 as granted by the primary driver (at block 608). The secondary device linking module 204 may also enable the communication device(s) 140 to send enabling signals to the TCU 120 of the vehicle 102 to possibly enable or disable the predetermined ignition modes of the vehicle 102 based on the respective enabling privilege level associated to the one or more secondary portable devices 110 as granted by the primary driver (at block 608).

Figure 7:
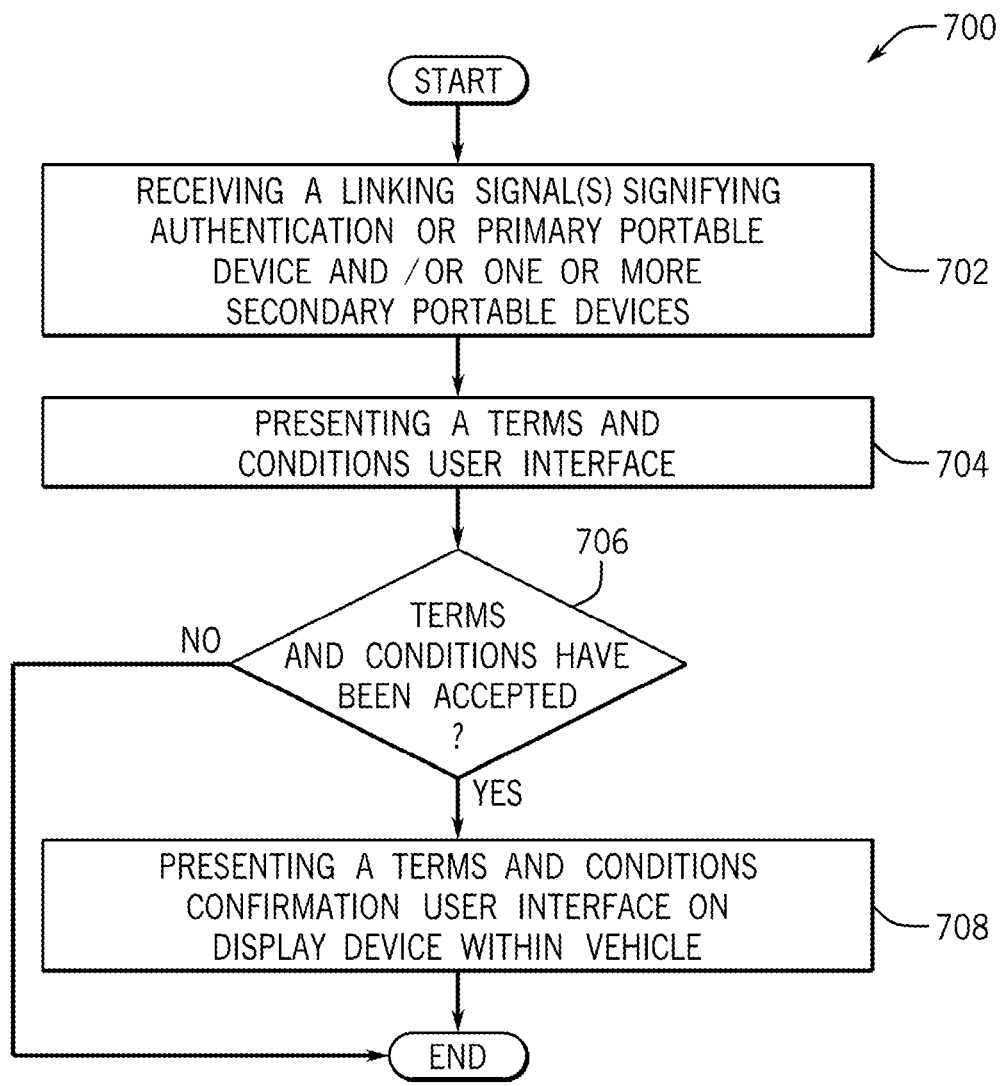
FIG. 7 is an illustrative process flow diagram for providing terms and conditions related to data off-boarding according to an exemplary embodiment.

With reference back to method 400 of FIG. 4, at block 406, the method 400 includes providing terms and conditions related to data off-boarding. Block 406 will now be described in more detail with reference to FIG. 7. FIG. 7 is an illustrative process flow diagram of an exemplary method 700 for providing terms and conditions related to data off-boarding. At block 702, the method 700 includes a receiving a linking signal signifying the linking of the primary portable device 108 and/or the one or more secondary portable devices 110 to the vehicle 102. In one embodiment, the primary device linking module 202 may send a respective linking signal to the data off-boarding consent module 206 that includes data associated to the linked primary portable device 108 that may include the device ID of the primary portable device 108. Additionally or alternatively, the secondary device linking module 204 may send one or more respective linking signals to the data off-boarding consent module 206 that includes data associated to the one or more linked secondary portable devices 110.

At block 704, the method 700 includes presenting a terms and conditions user interface. In one embodiment, upon receipt of the respective linking signal(s), the data off-boarding consent module 206 may communicate a command signal to the control unit 130 of the primary portable devices 108 and/or the control unit(s) 132 of the one or more secondary portable devices 110 to present the terms and conditions user interface to the primary driver and/or the respective authorized user(s) through the touch screen display 142 and/or the touch screen display(s) 144. In some embodiments, the data off-boarding consent module 206 may communicate a command signal to the head unit 114 of the vehicle 102 to present a user interface on the display device 118 that may present the terms and conditions user interface through the display device 118 of the vehicle 102.

In one or more embodiments, the terms and conditions user interface may include terms and conditions that are related to the off-loading of vehicle data that may include but is not limited to vehicle identification number (VIN), POI information, geolocation information, data from the data log of the vehicle 102, and the like that may be packaged in the form of the vehicle data and transmitted through the TCU 120 of the vehicle 102 to the externally hosted server infrastructure 106. The terms and conditions user interface may also include one or more user interface input icons that may be associated to an acceptance and/or denial of the terms and conditions.

In some embodiments, the data off-boarding consent module 206 may present the terms and conditions user interface to the primary driver and/or the one or more authorized users each time the accessing and/or the enabling signal is received by the TCU 120 of the vehicle 102. In alternate embodiments, the data off-boarding consent module 206 may present the terms and conditions user interface to the primary driver and/or the one or more authorized users based on a predetermined schedule. For example, the terms and conditions user interface may be presented to the primary driver and/or the one or more authorized users every five times the enabling signal is sent to the vehicle 102, every first time the vehicle 102 is enabled on a monthly basis, or based on another factor such as the accessing and/enabling levels granted to the one or more respective authorized users.

At block 706, the method 700 includes determining if the terms and conditions have been accepted. In one embodiment, the data off-boarding consent module 206 may determine if the input has been received to accept the terms and conditions by the primary driver and/or the one or more authorized users. In one embodiment, upon the primary driver and/or the one or more authorized users providing an input to accept or deny the terms and conditions via the terms and conditions user interface, the data off-boarding consent module 206 may acknowledge the acceptance input or denial input provided through the primary portable device 108 and/or one or more secondary portable devices 110.

If it is determined that the terms and conditions have been accepted (at block 706), at block 708, the method 700 includes presenting a terms and conditions confirmation user interface on display device within vehicle 102. In an exemplary embodiment, the data off-boarding consent module 206 may send one or more user consent signals to the data off-boarding control module 208 indicative of the consent of the terms and conditions by the primary driver and/or the one or more authorized users. In one embodiment, upon receipt of the user consent signal(s), the data off-boarding control module 208 may send a command signal to the head unit 114 to present the terms and conditions confirmation user interface through the display device 118 of the vehicle 102. As discussed above, the terms and conditions confirmation user interface may present the confirmation message that the primary driver and/or the one or more authorized users have consented to the terms and conditions through the primary portable device 108 and/or the one or more secondary portable devices 110.

With reference back to method 400 of FIG. 4, at block 408, the method 400 includes controlling the vehicle 102 to enable data off-boarding of vehicle data. In embodiment, upon receiving consent of the terms and conditions by the primary driver and/or the one or more authorized users, the data off-boarding consent module 206 may send a respective consent signal to the data off-boarding control module 208 indicative of the consent of the terms and conditions. Upon receipt of the consent signal, the data off-boarding control module 208 may access the provisioning file from the storage unit 116 of the vehicle 102 and may further evaluate the provisioning file to determine the one or more types of vehicle data that are selected to be off-boarded from the vehicle 102 by the primary driver. Upon evaluation of the provisioning file, the data off-boarding control module may send an execution signal to the head unit 114 of the vehicle 102 and/or the ECU 112 of the vehicle 102 to enable the off-boarding of the selected one or more types of vehicle data. Upon receipt of the execution signal, the head unit 114 and/or the ECU 112 of the vehicle 102 may send a command to the TCU 120 of the vehicle 102 to enable off-boarding of the selected one or more types of vehicle data to the externally hosted server infrastructure 106.

In one embodiment, the TCU 120 may retrieve the selected types of vehicle data associated to the primary driver and/or one or more authorized users based on the display and acceptance of the terms and conditions on the primary portable device 108 and/or the one or more secondary portable devices 110 by the respective primary driver and/or one or more authorized users. In other words, if the primary driver accepts the terms and conditions through the touch screen display 142 or the display device 118, the TCU 120 may retrieve the selected types of vehicle data associated with the primary driver. Additionally, if the one or more authorized users accept the terms and conditions through the touch screen display(s) 144 or the display device 118, the TCU 120 may retrieve the selected types of vehicle data associated with the one or more authorized users (e.g., additional drivers of the vehicle 102). The TCU 120 may then off-board the selected types of vehicle data by communicating (e.g., transmitting) the vehicle data to the communication device(s) 148 to of the externally hosted server infrastructure 106 to be stored within the storage 146 or further utilized by one or more parties (e.g., third-party institutions, vehicle manufacturers, social media services, vehicle navigational services, vehicle maintenance services, traffic maintenance services, rental agencies, etc.).

The embodiments discussed herein may also be described and implemented in the context of non-transitory computer-readable storage medium storing computer-executable instructions. Non-transitory computer-readable storage media includes computer storage media and communication media. For example, flash memory drives, digital versatile discs (DVDs), compact discs (CDs), floppy disks, and tape cassettes. Non-transitory computer-readable storage media may include volatile and nonvolatile, removable and non-removable media implemented in any method or technology for storage of information such as computer readable instructions, data structures, modules or other data. Non-transitory computer readable storage media excludes transitory and propagated data signals.

It will be appreciated that various implementations of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also indented to be encompassed by the following claims.

The invention claimed is:

1. A method for providing access to a vehicle and enabling data off-boarding comprising:
    associating a primary portable device to the vehicle and granting privileges to the primary portable device;
    associating at least one secondary portable device to the vehicle by granting privileges to the at least one secondary portable device through the primary portable device;
    providing terms and conditions related to data off-boarding to the primary portable device when the primary portable device is associated to the vehicle;
    providing terms and conditions related to data off-boarding to the at least one secondary portable device when the at least one secondary portable device is associated to the vehicle through the primary portable device;
    controlling off-boarding of vehicle data of a driver associated with the primary portable device when the terms and conditions on the primary portable device are accepted; and
    controlling off-boarding of vehicle data of an authorized user associated with the at least one secondary portable device when the terms and conditions on the at least one secondary portable device are accepted.

2. The method of claim 1, wherein associating the primary portable device to the vehicle comprises creating a vehicle owner profile that includes a device identification of the primary portable device, wherein the device identification of the primary portable device is updated within a vehicle link table that includes data associated with the primary portable device that is linked to the vehicle, wherein associating the primary portable device to the vehicle additionally includes authenticating the primary portable device and creating a provisioning file associated with the vehicle and granting vehicle accessing privileges, vehicle enabling privileges and vehicle administrative privileges to the primary portable device.

3. The method of claim 2, wherein granting the vehicle administrative privileges to the primary portable device comprises granting a level of accessing the vehicle and a level of enabling the vehicle to the at least one secondary portable device, wherein the level of accessing the vehicle is associated with at least one of time based vehicle accessing privileges and usage based vehicle accessing privileges and wherein the level of enabling the vehicle is associated with at least one of time based vehicle enabling privileges and usage based vehicle enabling privileges.

4. The method of claim 2, comprising determining if the provisioning file has been accessed for a predetermined amount of time, wherein determining if the provisioning file has been accessed for the predetermined amount of time includes evaluating an access timestamp integrated within the provisioning file to determine if the provisioning file has been accessed within the predetermined amount of time.

5. The method of claim 1, wherein associating at least one secondary portable device to the vehicle by the primary portable device comprises updating a vehicle link table with a device identification of the at least one secondary portable device and granting at least one of a level of vehicle accessing privileges and a level of vehicle enabling privileges to the at least one secondary portable device, wherein a vehicle administration interface is presented on the primary portable device that includes a selection of the vehicle accessing privileges and the vehicle enabling privileges to be granted to the at least one secondary portable device.

6. The method of claim 5, wherein associating at least one secondary portable device to the vehicle by the primary portable device comprises selecting at least one of the level of the vehicle accessing privileges to be granted to the at least one secondary portable device, and the level of the vehicle enabling privileges to be granted to the at least one secondary portable device, wherein the level of vehicle accessing privileges and the level of vehicle enabling privileges includes at least one of usage based vehicle accessing privileges to unlock and lock at least one lock of at least one predetermined location of the vehicle, time based vehicle accessing privileges to unlock and lock the at least one lock of the at least one predetermined location of the vehicle for a predetermined period of time, usage based vehicle accessing privileges to enable and disable at least one predetermined ignition mode of the vehicle, and time based vehicle enabling privileges to enable and disable at least one predetermined ignition mode of the vehicle for the predetermined period of time.

7. The method of claim 6, wherein associating at least one secondary portable device to the vehicle through the primary portable device comprises sending the device identification of the at least one secondary portable device and at least one of an accessing signal and an enabling signal to a communication device of the primary portable device, wherein the accessing signal is associated with an input provided through the at least one secondary portable device to unlock and lock at least one lock of the at least one predetermined location of the vehicle, wherein the enabling signal is associated with an input provided through the at least one secondary portable device to enable and disable at least one predetermined ignition mode of the vehicle.

8. The method of claim 6, wherein associating the at least one secondary portable device to the vehicle comprises querying the vehicle link table to retrieve the device identification of the at least one secondary portable device, wherein a command signal is sent to a communication device of the primary portable device to communicate a permission signal to the at least one secondary portable device, wherein the permission signal grants the at least one secondary portable device with at least one of the vehicle accessing and the vehicle enabling privileges.

9. The method of claim 1, wherein providing the terms and conditions related to data off-boarding to the primary portable device comprises presenting a user interface with terms and conditions that are related to data off-boarding of the vehicle data with at least one user interface input that allows acceptance or denial of the terms and conditions on at least one of the primary portable device, the at least one secondary portable device, and a display device of the vehicle.

10. The method of claim 1, wherein controlling the off-boarding of vehicle data of the driver associated with the primary portable device comprises evaluating a provisioning file to determine one or more selected types of the vehicle data to be off-boarded from the vehicle and sending a command signal to a telematics control unit of the vehicle to off-board the one or more selected types of vehicle data by communicating the one or more selected types of vehicle data to an externally hosted server infrastructure, wherein the telematics control unit accesses the one or more selected types of vehicle data by completing at least one of a retrieval of the one or more selected types of vehicle data stored on a storage unit of the vehicle, and a retrieval of the one or more selected types of vehicle data from at least one vehicle system of the vehicle.

11. A system for providing access to a vehicle and enabling data off-boarding comprising:
a memory storing instructions when executed by a processor cause the processor to:
link at least one secondary portable device to the vehicle by granting privileges to the at least one secondary portable device through a primary portable device;
provide terms and conditions related to data off-boarding to the at least one secondary portable device when the at least one secondary portable device is linked to the vehicle through the primary portable device; and
control off-boarding of vehicle data of an authorized user associated with the at least one secondary portable device when the terms and conditions on the at least one secondary portable device are accepted.

12. The system of claim 11, wherein linking at least one secondary portable device to the vehicle by the primary portable device comprises updating a vehicle link table with a device identification of the at least one secondary portable device and granting at least one of a level of vehicle accessing privileges and a level of vehicle enabling privileges to the at least one secondary portable device, wherein a vehicle administration interface is presented on the primary portable device that includes a selection of the vehicle accessing privileges and the vehicle enabling privileges to be granted to the at least one secondary portable device.

13. The system of claim 12, wherein linking at least one secondary portable device to the vehicle by the primary portable device comprises selecting at least one of the level of the vehicle accessing privileges to be granted to the at least one secondary portable device, and the level of the vehicle enabling privileges to be granted to the at least one secondary portable device, wherein the level of vehicle accessing privileges and the level of vehicle enabling privileges includes at least one of usage based vehicle accessing privileges to unlock and lock at least one lock of at least one predetermined location of the vehicle, time based vehicle accessing privileges to unlock and lock the at least one lock of the at least one predetermined location of the vehicle for a predetermined period of time, usage based vehicle accessing privileges to enable and disable at least one predetermined ignition mode of the vehicle, and time based vehicle enabling privileges to enable and disable at least one predetermined ignition mode of the vehicle for the predetermined period of time.

14. The system of claim 13, wherein linking at least one secondary portable device to the vehicle by the primary portable device comprises sending the device identification of the at least one secondary portable device and at least one of an accessing signal and an enabling signal to a communication device of the primary portable device, wherein the accessing signal is associated with an input provided through the at least one secondary portable device to unlock and lock the at least one lock of the at least one predetermined location of the vehicle, wherein the enabling signal is associated with an input provided through the at least one secondary portable device to enable and disable at least one predetermined ignition mode of the vehicle.

15. The system of claim 14, wherein linking the at least one secondary portable device to the vehicle comprises querying the vehicle link table to retrieve the device identification of the at least one secondary portable device, wherein a command signal is sent to the communication device of the primary portable device to communicate a permission signal to at least one secondary portable device, wherein the permission signal grants the at least one secondary portable device with at least one of the vehicle accessing and the vehicle enabling privileges.

16. The system of claim 11, wherein providing the terms and conditions related to data off-boarding to the at least one secondary portable device comprises presenting a user interface with terms and conditions that are related to data off-boarding of vehicle data with at least one user interface input that allows acceptance or denial of the terms and conditions on the at least one secondary portable device, wherein a terms and conditions confirmation user interface that presents a confirmation message of consent to the terms and conditions is presented on a display device of the vehicle based on acceptance of the terms and conditions.

17. A system for providing access to a vehicle and enabling data off-boarding comprising:

a memory storing instructions when executed by a processor cause the processor to:
　　link a primary portable device to the vehicle and grant privileges to the primary portable device through an externally hosted server infrastructure;
　　provide terms and conditions related to data off-boarding to the primary portable device when the primary portable device is linked to the vehicle through the externally hosted server infrastructure; and
　　control off-boarding of vehicle data of a driver associated with the primary portable device when the terms and conditions on the primary portable device are accepted.

18. The system of claim 17, wherein linking the primary portable device to the vehicle comprises creating a vehicle owner profile that includes a device identification of the primary portable device, wherein the device identification of the primary portable device is updated within a vehicle link table stored on the externally hosted server infrastructure that includes data associated with the primary portable device that is linked to the vehicle, wherein linking the primary portable device to the vehicle additionally includes authenticating the primary portable device and creating a provisioning file associated with the vehicle and granting vehicle accessing privileges, vehicle enabling privileges, and vehicle administrative privileges to the primary portable device.

19. The system of claim 17, wherein granting vehicle administrative privileges to the primary portable device comprises granting a level of accessing the vehicle and a level of enabling the vehicle to at least one secondary portable device, wherein the level of accessing the vehicle is associated with at least one of time based vehicle accessing privileges and usage based vehicle accessing privileges, wherein the level of enabling the vehicle is associated with at least one of time based vehicle enabling privileges and usage based vehicle enabling privileges.

20. The system of claim 17, wherein providing the terms and conditions related to data off-boarding to the primary portable device comprises presenting a user interface with terms and conditions that are related to data off-boarding of vehicle data with at least one user interface input that allows acceptance or denial of the terms and conditions on the primary portable device, wherein a terms and conditions confirmation user interface that presents a confirmation message of consent to the terms and conditions is presented on a display device of the vehicle based on acceptance of the terms and conditions.

* * * * *